US012719959B2

(12) United States Patent
Ma et al.

(10) Patent No.: US 12,719,959 B2
(45) Date of Patent: Aug. 25, 2026

(54) OVER-THE-AIR UPGRADE METHOD, APPARATUS, AND SYSTEM, STORAGE MEDIUM, AND PROGRAM

(71) Applicant: Yinwang Intelligent Technologies Co., Ltd., Shenzhen (CN)

(72) Inventors: Tao Ma, Beijing (CN); Zheng Zhou, Beijing (CN)

(73) Assignee: Yinwang Intelligent Technologies Co., Ltd., Shenzhen (CN)

( * ) Notice: Subject to any disclaimer, the term of this patent is extended or adjusted under 35 U.S.C. 154(b) by 178 days.

(21) Appl. No.: 18/468,277

(22) Filed: Sep. 15, 2023

(65) Prior Publication Data

US 2024/0007539 A1 Jan. 4, 2024

Related U.S. Application Data

(63) Continuation of application No. PCT/CN2021/081395, filed on Mar. 17, 2021.

(51) Int. Cl.

*G06F 9/44* (2018.01)
*G06F 8/65* (2018.01)
*H04L 67/00* (2022.01)
*H04L 67/12* (2022.01)
*H04L 67/52* (2022.01)

(52) U.S. Cl.

CPC ................ *H04L 67/34* (2013.01); *G06F 8/65* (2013.01); *H04L 67/12* (2013.01); *H04L 67/52* (2022.05)

(58) Field of Classification Search

CPC ........................................................ H04L 67/34
USPC ........................................................... 717/172
See application file for complete search history.

(56) References Cited

U.S. PATENT DOCUMENTS 9,086,941 B1 * 7/2015 Siegel ..................... H04L 67/55
11,119,757 B2 * 9/2021 Gintz .................. B60W 50/045
2016/0137309 A1 * 5/2016 Abernathy ............... G08G 5/74 340/947
2019/0098468 A1 * 3/2019 Yamamoto ....... G08G 1/096716
2019/0310843 A1 * 10/2019 Fox ..................... G06F 12/0646

FOREIGN PATENT DOCUMENTS

CN 109213499 A 1/2019
CN 110162323 A * 8/2019 ............... G06F 8/65
CN 110874229 A 3/2020

(Continued)

OTHER PUBLICATIONS

International Search Report and Written Opinion in International Appln. No. PCT/CN2021/081395, mailed on Dec. 14, 2021, 15 pages (with English translation).

(Continued)

*Primary Examiner* — Evral E Bodden
(74) *Attorney, Agent, or Firm* — Fish & Richardson P.C.

(57) ABSTRACT

Embodiments of this application disclose over-the-air upgrade methods, apparatuses, systems, and storage media. In an embodiment, a method includes: obtaining location information of a vehicle, and providing an upgrade service based on a locational relationship between the vehicle and a predefined area, wherein the predefined area comprises one or more of a dangerous area or a safe area, the dangerous area indicates an area in which upgrading is not allowed, and the safe area indicates an area in which upgrading is allowed.

18 Claims, 13 Drawing Sheets

(56) References Cited

FOREIGN PATENT DOCUMENTS

| | | | | |
|---|---|---|---|---|
| CN | 112514354 | A | | 3/2021 |
| CN | 112669619 | A | * | 4/2021 |
| WO | 2020253404 | A1 | | 12/2020 |

OTHER PUBLICATIONS

Extended European Search Report in European Appln. No. 21930790.7, mailed on Mar. 25, 2024, 10 pages.

* cited by examiner

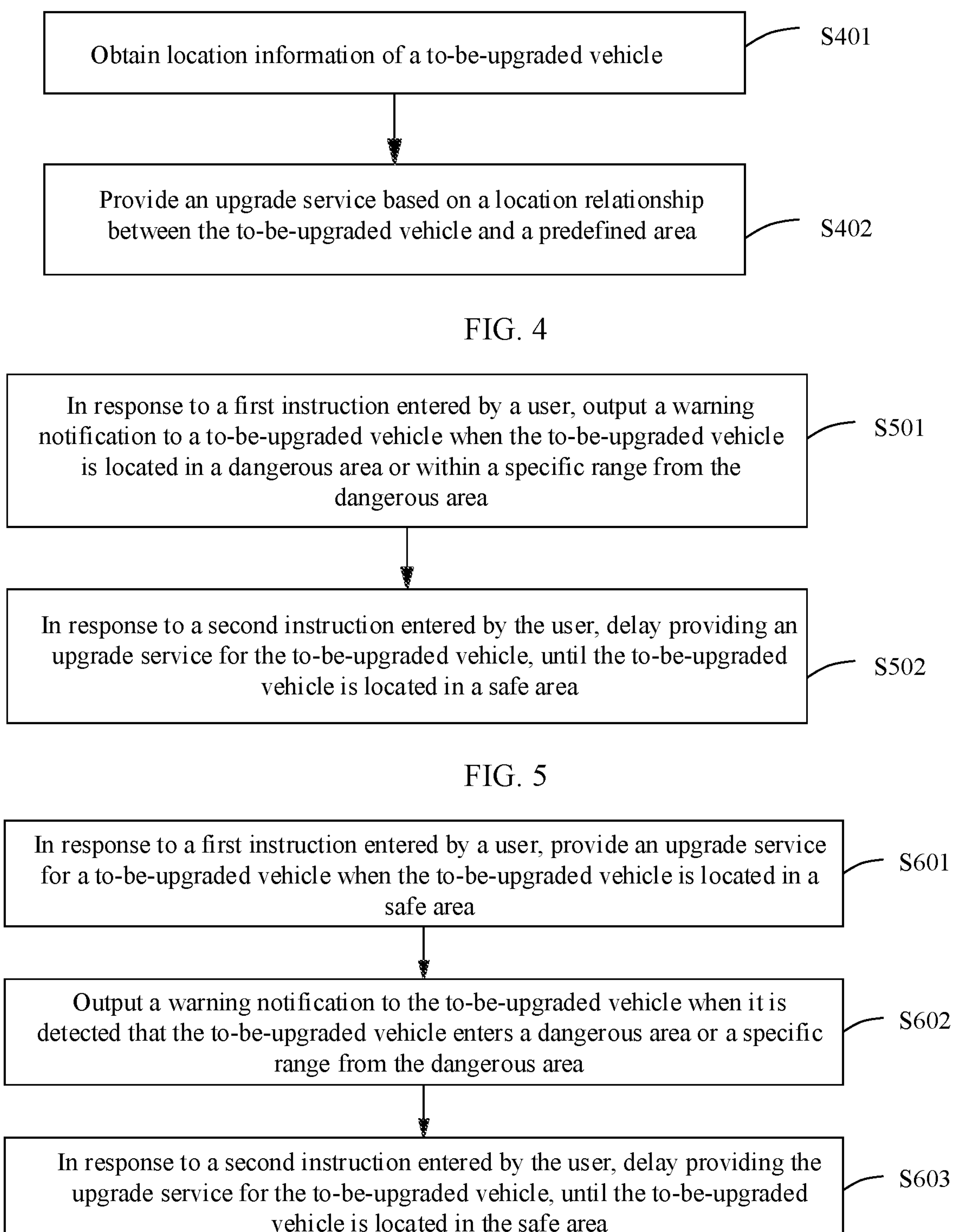
Obtain location information of a to-be-upgraded vehicle
S401
Provide an upgrade service based on a location relationship between the to-be-upgraded vehicle and a predefined area
S402
FIG. 4
In response to a first instruction entered by a user, output a warning notification to a to-be-upgraded vehicle when the to-be-upgraded vehicle is located in a dangerous area or within a specific range from the dangerous area
S501
In response to a second instruction entered by the user, delay providing an upgrade service for the to-be-upgraded vehicle, until the to-be-upgraded vehicle is located in a safe area
S502
FIG. 5
In response to a first instruction entered by a user, provide an upgrade service for a to-be-upgraded vehicle when the to-be-upgraded vehicle is located in a safe area
S601
Output a warning notification to the to-be-upgraded vehicle when it is detected that the to-be-upgraded vehicle enters a dangerous area or a specific range from the dangerous area
S602
In response to a second instruction entered by the user, delay providing the upgrade service for the to-be-upgraded vehicle, until the to-be-upgraded vehicle is located in the safe area
S603
FIG. 6

OVER-THE-AIR UPGRADE METHOD, APPARATUS, AND SYSTEM, STORAGE MEDIUM, AND PROGRAM

CROSS-REFERENCE TO RELATED APPLICATIONS

This application is a continuation of International Application No. PCT/CN2021/081395, filed on Mar. 17, 2021, the disclosure of which is hereby incorporated by reference in its entirety.

TECHNICAL FIELD

This application relates to the field of device upgrade technologies, and in particular, to an over-the-air upgrade method, apparatus, and system, a storage medium, and a program.

BACKGROUND

Remote online upgrading is as follows: When a device (such as a computer or a mobile phone) is connected to a network, an upgrade file is downloaded from a server to update an operating system or software to a latest status, and the device can be autonomously upgraded without much manual intervention.

For example, a to-be-upgraded device is a vehicle-mounted device. In the future, each vehicle is one network node in the Internet of vehicles, and has no essential difference from a network-connected device such as a computer or a mobile phone. Therefore, a future vehicle-mounted device is upgraded in a more flexible remote online upgrade manner, for example, an over-the-air (Over-The-Air, OTA) download technology, just as a computer or a mobile phone is remotely upgraded through a network nowadays.

However, there may be some safety hazards in an over-the-air upgrade process of a vehicle.

SUMMARY

Embodiments of this application provide an over-the-air upgrade method, apparatus, and system, a storage medium, and a program, to control a vehicle not to be upgraded in a dangerous area but to be upgraded in a safe area, thereby performing safety control on vehicle upgrading, and implementing safe upgrading.

According to a first aspect, this application provides an over-the-air upgrade method, which may be applied to an upgrade server or an upgrade server chip. The method includes: obtaining location information of a to-be-upgraded vehicle; and providing an upgrade service based on a location relationship between the to-be-upgraded vehicle and a predefined area, where the predefined area includes one or more of a dangerous area and a safe area, the dangerous area is used to indicate an area in which upgrading is not allowed, and the safe area is used to indicate an area in which upgrading is allowed.

The predefined area may include only the safe area, or include only the dangerous area, or include the safe area and the dangerous area. The safe area is used to indicate an area in which upgrading is allowed. To be specific, for vehicle upgrading in the safe area, there is no safety hazard, and upgrading may be performed. Therefore, when located in the safe area, the to-be-upgraded vehicle is allowed to be upgraded. The dangerous area is used to indicate an area in which upgrading is not allowed. To be specific, for vehicle upgrading in the dangerous area, there is a safety hazard. Therefore, when located in the dangerous area, the to-be-upgraded vehicle is not allowed to be upgraded, to avoid a traffic accident. According to this embodiment of this application, the upgrade server determines the location relationship between the to-be-upgraded vehicle and the predefined area, and further provides the upgrade service based on the location relationship between the to-be-upgraded vehicle and the predefined area. In this way, safety control can be performed on vehicle upgrading, thereby implementing safe upgrading.

In a possible implementation thereof, the providing an upgrade service based on a location relationship between the to-be-upgraded vehicle and a predefined area includes: determining an area attribute of a location of the to-be-upgraded vehicle based on the location of the to-be-upgraded vehicle, where the area attribute includes the dangerous area or the safe area. According to this embodiment of this application, the area attribute of the location of the to-be-upgraded vehicle is determined, to determine whether an area in which the to-be-upgraded vehicle is located is the safe area or the dangerous area, and the upgrade service is provided based on the area attribute of the location of the to-be-upgraded vehicle, thereby implementing safe control.

In a possible implementation thereof, the determining an area attribute of a location of the to-be-upgraded vehicle based on the location of the to-be-upgraded vehicle specifically includes one or more of the following manners: when the location of the to-be-upgraded vehicle is a lane area, determining that the area attribute of the location of the to-be-upgraded vehicle is the dangerous area; when the location of the to-be-upgraded vehicle is a congested area, determining that the area attribute of the location of the to-be-upgraded vehicle is the dangerous area; or when the location of the to-be-upgraded vehicle is a slow-moving area, determining that the area attribute of the location of the to-be-upgraded vehicle is the dangerous area. The lane area, the congested area, and the slow-moving area are defined as dangerous areas, to avoid impact on traffic safety during over-the-air upgrading, and avoid impact on safety of the vehicle.

In a possible implementation thereof, the providing an upgrade service based on a location relationship between the to-be-upgraded vehicle and a predefined area further includes: when the to-be-upgraded vehicle is located in the safe area, providing the upgrade service for the to-be-upgraded vehicle; or when the to-be-upgraded vehicle is located in the dangerous area or within a specific range from the dangerous area, suspending providing the upgrade service. According to this embodiment of this application, when the to-be-upgraded vehicle is located in the safe area, the upgrade server provides the upgrade service for the to-be-upgraded vehicle; or when the to-be-upgraded vehicle is located in the dangerous area, the upgrade server does not provide the upgrade service for the to-be-upgraded vehicle. In this way, safety control is performed on vehicle upgrading, thereby implementing safe upgrading.

In a possible implementation thereof, a boundary of one or more of the dangerous area and the safe area is adjustable. According to this embodiment of this application, the boundary of one or more of the dangerous area and the safe area is adjusted, to increase applicability and improve user experience.

In a possible implementation thereof, that a boundary of one or more of the dangerous area and the safe area is adjustable specifically includes: a boundary of the dangerous area or a boundary of the safe area is adjusted based on real-time information received in real time, where the real-time information includes one or more of information that affects a definition of the boundary of the dangerous area and information that affects a definition of the boundary of the safe area, and the real-time information further includes one or more of the following pieces of information: a risk of an upgrade task, current road condition information, and positioning precision of the to-be-upgraded vehicle. According to this embodiment of this application, the boundaries of the dangerous area and the safe area are adjusted based on the real-time information received in real time, to increase applicability and improve user experience.

In a possible implementation thereof, the upgrade service includes one or more of the following services: pushing an upgrade message to the to-be-upgraded vehicle, or sending an upgrade package download address to the to-be-upgraded vehicle, or sending an upgrade package to the to-be-upgraded vehicle.

In a possible implementation thereof, the method further includes: in response to a first instruction entered by a user, outputting a warning notification to the to-be-upgraded vehicle when the to-be-upgraded vehicle is located in the dangerous area or within the specific range from the dangerous area, where the first instruction is used to instruct to provide the upgrade service for the to-be-upgraded vehicle, and the warning notification is used to indicate that the current to-be-upgraded vehicle is not suitable for upgrading; and in response to a second instruction entered by the user, delaying providing the upgrade service for the to-be-upgraded vehicle, until the to-be-upgraded vehicle is located in the safe area, where the second instruction is used to instruct to delay providing the upgrade service for the to-be-upgraded vehicle.

In a possible implementation thereof, the providing an upgrade service based on a location relationship between the to-be-upgraded vehicle and a predefined area further includes: when the to-be-upgraded vehicle is located in the dangerous area or within the specific range from the dangerous area, delaying providing the upgrade service for the to-be-upgraded vehicle, until the to-be-upgraded vehicle is located in the safe area.

In a possible implementation thereof, the method further includes: in response to a first instruction entered by a user, providing the upgrade service for the to-be-upgraded vehicle when the to-be-upgraded vehicle is located in the safe area, where the first instruction is used to instruct to provide the upgrade service for the to-be-upgraded vehicle; outputting a warning notification to the to-be-upgraded vehicle when it is detected that the to-be-upgraded vehicle enters the dangerous area or the specific range from the dangerous area, where the warning notification is used to indicate that the current to-be-upgraded vehicle is not suitable for upgrading; and in response to a second instruction entered by the user, delaying providing the upgrade service for the to-be-upgraded vehicle, until the to-be-upgraded vehicle is located in the safe area, where the second instruction is used to instruct to delay providing the upgrade service for the to-be-upgraded vehicle.

According to a second aspect, this application provides an over-the-air upgrade method, which may be applied to a vehicle, a terminal installed on a vehicle to assist in vehicle driving, or a chip in a terminal. The method includes: obtaining location information of a to-be-upgraded vehicle; and performing an upgrade operation based on a location relationship between the to-be-upgraded vehicle and a predefined area, where the predefined area includes one or more of a dangerous area and a safe area, the dangerous area is used to indicate an area in which upgrading is not allowed, and the safe area is used to indicate an area in which upgrading is allowed.

In a possible implementation thereof, the performing an upgrade operation based on a location relationship between the to-be-upgraded vehicle and a predefined area includes: determining an area attribute of a location of the to-be-upgraded vehicle based on the location of the to-be-upgraded vehicle, where the area attribute includes the dangerous area or the safe area.

In a possible implementation thereof, the determining an area attribute of a location of the to-be-upgraded vehicle based on the location of the to-be-upgraded vehicle specifically includes one or more of the following manners: when the location of the to-be-upgraded vehicle is a lane area, determining that the area attribute of the location of the to-be-upgraded vehicle is the dangerous area; when the location of the to-be-upgraded vehicle is a congested area, determining that the area attribute of the location of the to-be-upgraded vehicle is the dangerous area; or when the location of the to-be-upgraded vehicle is a slow-moving area, determining that the area attribute of the location of the to-be-upgraded vehicle is the dangerous area.

In a possible implementation thereof, the performing an upgrade operation based on a location relationship between the to-be-upgraded vehicle and a predefined area further includes: when the to-be-upgraded vehicle is located in the safe area, performing the upgrade operation; or when the to-be-upgraded vehicle is located in the dangerous area or within a specific range from the dangerous area, suspending performing the upgrade operation.

In a possible implementation thereof, a boundary of one or more of the dangerous area and the safe area is adjustable.

In a possible implementation thereof, that a boundary of one or more of the dangerous area and the safe area is adjustable specifically includes: a boundary of the dangerous area or a boundary of the safe area is adjusted based on real-time information received in real time, where the real-time information includes one or more of information that affects a definition of the boundary of the dangerous area and information that affects a definition of the boundary of the safe area, and the real-time information further includes one or more of the following pieces of information: a risk of an upgrade task, current road condition information, and positioning precision of the to-be-upgraded vehicle.

In a possible implementation thereof, the upgrade operation includes one or more of the following operations: requesting upgrade permission from a user, or downloading an upgrade package, or performing upgrading based on an upgrade package.

In a possible implementation thereof, the method further includes: displaying the safe area on an electronic map in a first display manner; and displaying the dangerous area on the electronic map in a second display manner different from the first display manner.

In a possible implementation thereof, the method further includes: in response to a first instruction entered by the user, outputting a warning notification when the to-be-upgraded vehicle is located in the dangerous area or within the specific range from the dangerous area, where the first instruction is used to instruct to perform the upgrade operation, and the warning notification is used to indicate that the current to-be-upgraded vehicle is not suitable for upgrading; and in response to a second instruction entered by the user, delaying performing the upgrade operation, until the to-be-upgraded vehicle is located in the safe area, where the second instruction is used to instruct to delay performing the upgrade operation.

In a possible implementation thereof, the performing an upgrade operation based on a location relationship between the to-be-upgraded vehicle and a predefined area further includes: when the to-be-upgraded vehicle is located in the dangerous area or within the specific range from the dangerous area, delaying performing the upgrade operation, until the to-be-upgraded vehicle is located in the safe area.

In a possible implementation thereof, the method further includes: in response to a first instruction entered by the user, performing the upgrade operation when the to-be-upgraded vehicle is located in the safe area, where the first instruction is used to instruct to perform the upgrade operation; outputting a warning notification when it is detected that the to-be-upgraded vehicle enters the dangerous area or the specific range from the dangerous area, where the warning notification is used to indicate that the current to-be-upgraded vehicle is not suitable for upgrading; and in response to a second instruction entered by the user, delaying performing the upgrade operation, until the to-be-upgraded vehicle is located in the safe area, where the second instruction is used to instruct to delay performing the upgrade operation.

In a possible implementation thereof, the method further includes: providing a human-machine interface; receiving the first instruction entered by the user by using the human-machine interface, where the first instruction is used to instruct to perform the upgrade operation; in response to the first instruction, outputting the warning notification by using the human-machine interface when the to-be-upgraded vehicle is located in the dangerous area or within the specific range from the dangerous area; receiving the second instruction entered by the user by using the human-machine interface, where the second instruction is used to instruct to delay performing the upgrade operation; and in response to the second instruction, delaying performing the upgrade operation, until the to-be-upgraded vehicle is located in the safe area.

In a possible implementation thereof, the method further includes: displaying the electronic map by using the human-machine interface, where the electronic map includes one or more of the safe area and the dangerous area, the safe area is displayed on the electronic map in the first display manner, and the dangerous area is displayed on the electronic map in the second display manner different from the first display manner.

According to a third aspect, this application provides an over-the-air upgrade method, which may be applied to a vehicle, a terminal installed on a vehicle to assist in vehicle driving, or a chip in a terminal. The method includes: outputting an upgrade notification by using a human-machine interface; receiving a first instruction entered by a user by using the human-machine interface, where the first instruction is used to instruct to perform an upgrade operation; in response to the first instruction, determining a location relationship between a to-be-upgraded vehicle and a predefined area, where the predefined area includes a dangerous area, and the dangerous area is used to indicate an area in which upgrading is not allowed; and if the to-be-upgraded vehicle is located in the dangerous area or within a specific range from the dangerous area, suspending performing the upgrade operation, and outputting a warning notification by using the human-machine interface.

In a possible implementation thereof, the predefined area further includes a safe area, the safe area is used to indicate an area in which upgrading is allowed, and the method further includes: receiving a second instruction entered by the user by using the human-machine interface, where the second instruction is used to instruct to delay performing the upgrade operation; in response to the second instruction, detecting whether the to-be-upgraded vehicle is located in the safe area; and if yes, outputting the upgrade notification by using the human-machine interface.

In a possible implementation thereof, the method further includes: displaying an electronic map by using the human-machine interface, where the electronic map includes one or more of the safe area and the dangerous area, the safe area is displayed on the electronic map in a first display manner, and the dangerous area is displayed on the electronic map in a second display manner different from the first display manner.

According to a fourth aspect, this application provides an apparatus. The over-the-air upgrade apparatus may include an upgrade server, a vehicle, a terminal installed on a vehicle to assist in vehicle driving, or a chip in a terminal. The apparatus may include a processor, configured to execute a computer program. When the computer program is executed, the processor is configured to perform the method according to any one of the first aspect or the optional implementations of the first aspect, the method according to any one of the second aspect or the optional implementations of the second aspect, and the method according to any one of the third aspect or the optional implementations of the third aspect.

According to a fifth aspect, this application provides an over-the-air upgrade system, including an upgrade server and a to-be-upgraded vehicle. A connection is established between the upgrade server and the to-be-upgraded vehicle. The upgrade server is configured to obtain location information of the to-be-upgraded vehicle, and provide an upgrade service based on a location relationship between the to-be-upgraded vehicle and a predefined area. The predefined area includes one or more of a dangerous area and a safe area. The dangerous area is used to indicate an area in which upgrading is not allowed. The safe area is used to indicate an area in which upgrading is allowed. The to-be-upgraded vehicle is configured to perform an upgrade operation.

According to a sixth aspect, this application provides a computer-readable storage medium. The computer-readable storage medium includes computer instructions. When the computer instructions are run on an electronic device, the electronic device is enabled to perform the method according to any one of the first aspect or the optional implementations of the first aspect, the method according to any one of the second aspect or the optional implementations of the second aspect, and the method according to any one of the third aspect or the optional implementations of the third aspect.

According to a seventh aspect, this application provides a computer program. The computer program includes computer instructions. When the computer instructions are run on an electronic device, the electronic device is enabled to perform the method according to any one of the first aspect or the optional implementations of the first aspect, the method according to any one of the second aspect or the optional implementations of the second aspect, and the method according to any one of the third aspect or the optional implementations of the third aspect.

Technical effects achieved by the second aspect, the third aspect, the fourth aspect, the fifth aspect, the sixth aspect, and the seventh aspect are similar to technical effects achieved by corresponding technical means in the first aspect. Details are not described herein again.

The technical solutions are as follows:

Beneficial effects brought by the technical solutions provided in this application include at least the following:

In embodiments of this application, the safe area and the dangerous area are defined, so that the location information of the to-be-upgraded vehicle is obtained during over-the-air upgrading, and the upgrade service is provided based on the location relationship between the to-be-upgraded vehicle and the predefined area. In this way, the to-be-upgraded vehicle can be properly controlled to be at a suitable place, thereby ensuring upgrade safety, and eliminating hazards to safety of the vehicle and traffic safety.

BRIEF DESCRIPTION OF DRAWINGS

FIG. 4 is a schematic flowchart of an over-the-air upgrade method according to an embodiment of this application;

FIG. 5 is a schematic flowchart of another over-the-air upgrade method according to an embodiment of this application;

FIG. 6 is a schematic flowchart of another over-the-air upgrade method according to an embodiment of this application;

DESCRIPTION OF EMBODIMENTS

Figure 1:
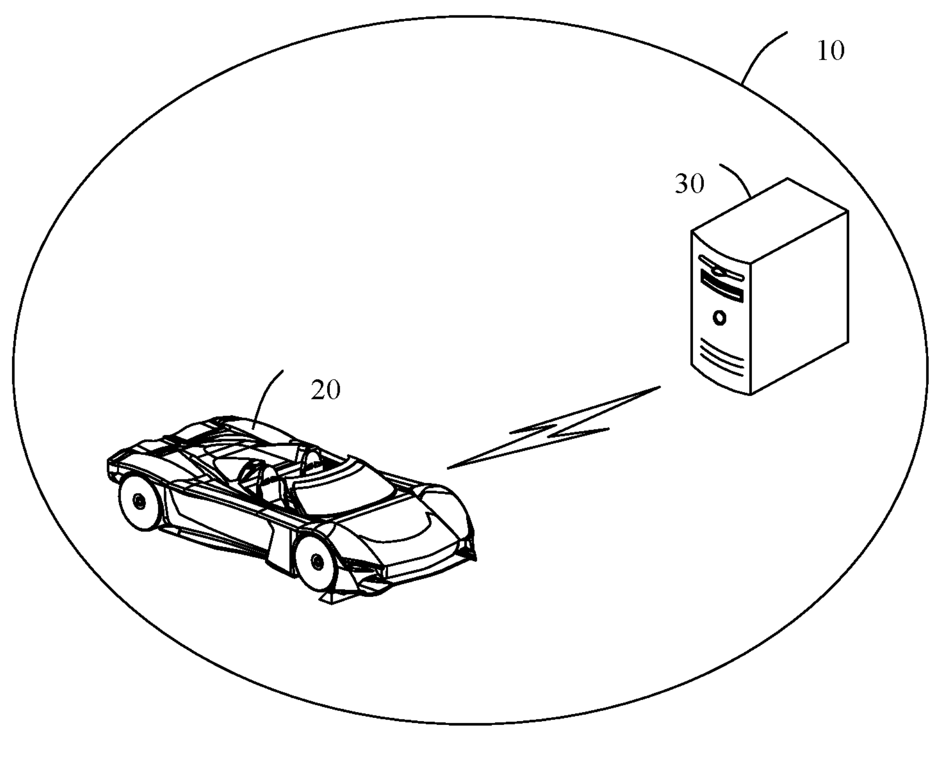
FIG. 1 is a schematic diagram of a structure of an over-the-air upgrade system according to an embodiment of this application.

To make the objectives, technical solutions, and advantages of embodiments of this application clearer, the following clearly and completely describes the technical solutions in embodiments of this application with reference to the accompanying drawings in embodiments of this application. Apparently, the described embodiments are merely some but not all of embodiments of this application. All other embodiments obtained by a person of ordinary skill in the art based on embodiments of this application without creative efforts shall fall within the protection scope of this application.

Before embodiments of this application are described in detail, application scenarios related to embodiments of this application are first described.

With the development of self driving, people require increasingly high computing and control capabilities of automobiles. More automobile functions are provided in a form of software, and software defined cars are becoming an important trend of automobile development. Software defined cars require that an automobile can conveniently install and update software like a computer or a smartphone, so that the automobile is "always new through frequent use". A conventional automobile software update requires a user to drive a vehicle to a 4S shop or a maintenance service outlet, so that a professional technician updates software in the vehicle by using a dedicated device. An over-the-air (Over-The-Air, OTA) download technology provides a technical means for remotely upgrading automobile software or fixing automobile software defects. A user may connect to the cloud by using the OTA technology, to download and install software. This greatly reduces time and space limitations on automobile software upgrading. Therefore, the OTA technology is applied to more automobiles. Over-the-air download steps usually include four steps: upgrade notification, user permission, upgrade package download, and upgrade execution. An upgrade server notifies a vehicle of an upgrade task. The vehicle notifies a user and requests user permission by using a human-machine interface. After the user chooses to consent, the upgrade server delivers an upgrade package to the vehicle. After the upgrade package is downloaded, the vehicle performs upgrading.

Although the OTA technology makes automobile software upgrade more convenient, the OTA technology also brings additional risks. In a software installation process of an automobile, an original software function is in an unavailable state, and even normal driving may be unachievable. This brings unpredictable threats to safety of the automobile and traffic safety. In addition, if over-the-air upgrade fails, original functions of the automobile may fail, causing the automobile to become unusable. This also brings hazards to safety of the automobile and traffic safety. Moreover, automobiles are generally upgraded in a stationary state, and a traffic safety risk problem may be caused when an automobile is stationary for upgrading. For example, when a vehicle is upgraded on a highway, even if the vehicle is upgraded in a stationary state, the upgrade may lead to a rear-end accident of another vehicle or cause traffic congestion.

Based on this, embodiments of this application provide an over-the-air upgrade method, where a predefined area is set, that is, an area in which upgrading is allowed and an area in which upgrading is not allowed are defined, location information of a to-be-upgraded vehicle is obtained, and an upgrade service is provided based on a location relationship between the to-be-upgraded vehicle and the predefined area. An over-the-air upgrade of an automobile is allowed only in the area in which upgrading is allowed, that is, a safe area. In this way, even if a vehicle is upgraded in a stationary state, the upgrade does not affect traffic safety or safety of the vehicle. An over-the-air upgrade of an automobile is not allowed in the area in which upgrading is not allowed, that is, a dangerous area. This avoids impact on traffic safety and safety of a vehicle caused by upgrading of the vehicle in an environment unsuitable for upgrading. An environment in which a to-be-upgraded vehicle is located is fully considered, so that the vehicle is upgraded in a suitable environment, thereby minimizing a safety risk brought by the upgrade.

FIG. 1 is a schematic diagram of a structure of an over-the-air upgrade system according to an embodiment of this application. The over-the-air upgrade system 10 includes a vehicle-mounted terminal device 20 and an upgrade server 30.

Optionally, the upgrade server 30 in this embodiment of this application may be understood as a network-side device, and may be an entire device or may be a chip in a device. The upgrade server 30 may provide an upgrade service for the vehicle-mounted terminal device 20. The upgrade service includes but is not limited to: pushing an upgrade message to the vehicle-mounted terminal device 20, sending an upgrade package download address to the vehicle-mounted terminal device 20, or sending an upgrade package to the vehicle-mounted terminal device 20.

Optionally, the vehicle-mounted terminal device 20 in this embodiment of this application may be a vehicle (vehicle), or a terminal installed on a vehicle to assist in vehicle driving, or a chip in a terminal, and may perform an upgrade operation. The upgrade operation includes but is not limited to: requesting upgrade permission from a user, downloading an upgrade package, and performing upgrading based on the upgrade package. The vehicle-mounted terminal device 20 may be user equipment (user equipment, UE), an access terminal, a terminal unit, a terminal station, a mobile station, a mobile console, a remote station, a remote terminal, a mobile device, a wireless communications device, a terminal agent, a terminal apparatus, or the like in a 5G network or a future evolved PLMN. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. The vehicle-mounted terminal device 20 may be mobile, or may be fixed.

Optionally, the upgrade server 30 in this embodiment of this application obtains location information of the to-be-upgraded vehicle, and provides the upgrade service based on a location relationship between the to-be-upgraded vehicle and a predefined area. The predefined area includes one or more of a dangerous area and a safe area. The dangerous area is used to indicate an area in which upgrading is not allowed, and the safe area is used to indicate an area in which upgrading is allowed.

Optionally, the vehicle-mounted terminal device 20 in this embodiment of this application obtains the location information of the to-be-upgraded vehicle, and performs the upgrade operation based on the location relationship between the to-be-upgraded vehicle and the predefined area. The predefined area includes one or more of the dangerous area and the safe area. The dangerous area is used to indicate the area in which upgrading is not allowed, and the safe area is used to indicate the area in which upgrading is allowed.

Optionally, the vehicle-mounted terminal device 20 or the upgrade server 30 in this embodiment of this application may be alternatively implemented as an apparatus, which may be a communications apparatus, and may be a general-purpose device or a dedicated device. This is not specifically limited in this embodiment of this application.

The technical solutions in embodiments of this application may be applied to various communications systems, for example, an orthogonal frequency division multiple access (orthogonal frequency-division multiple access, OFDMA) system, a single carrier frequency division multiple access (single carrier FDMA, SC-FDMA) system, and other systems. The term "system" may be interchanged with "network". The OFDMA system may implement wireless technologies such as evolved universal terrestrial radio access (evolved universal terrestrial radio access, EUTRA) and ultra mobile broadband (ultra mobile broadband, UMB). E-UTRA is an evolution version of a universal mobile telecommunications system (universal mobile telecommunications system, UMTS). The 3rd generation partnership project (3rd generation partnership project, 3GPP) uses a new version of E-UTRA for long term evolution (long term evolution, LTE) and various versions evolved based on LTE. A 5th generation (5th generation, 5G) communications system is a next-generation communications system under research. The 5G communications system includes a non-standalone (non-standalone, NSA for short) 5G mobile communications system, a standalone (standalone, SA) 5G mobile communications system, or an NSA 5G mobile communications system and an SA 5G mobile communications system. In addition, the communications systems may be further applicable to a future-oriented communications technology, and the technical solutions provided in embodiments of this application are applicable to all such systems. The foregoing communications systems to which this application is applicable are merely examples for description, and communications systems applicable to this application are not limited thereto. This is stated herein once for all, and is not repeated below.

Figure 2:
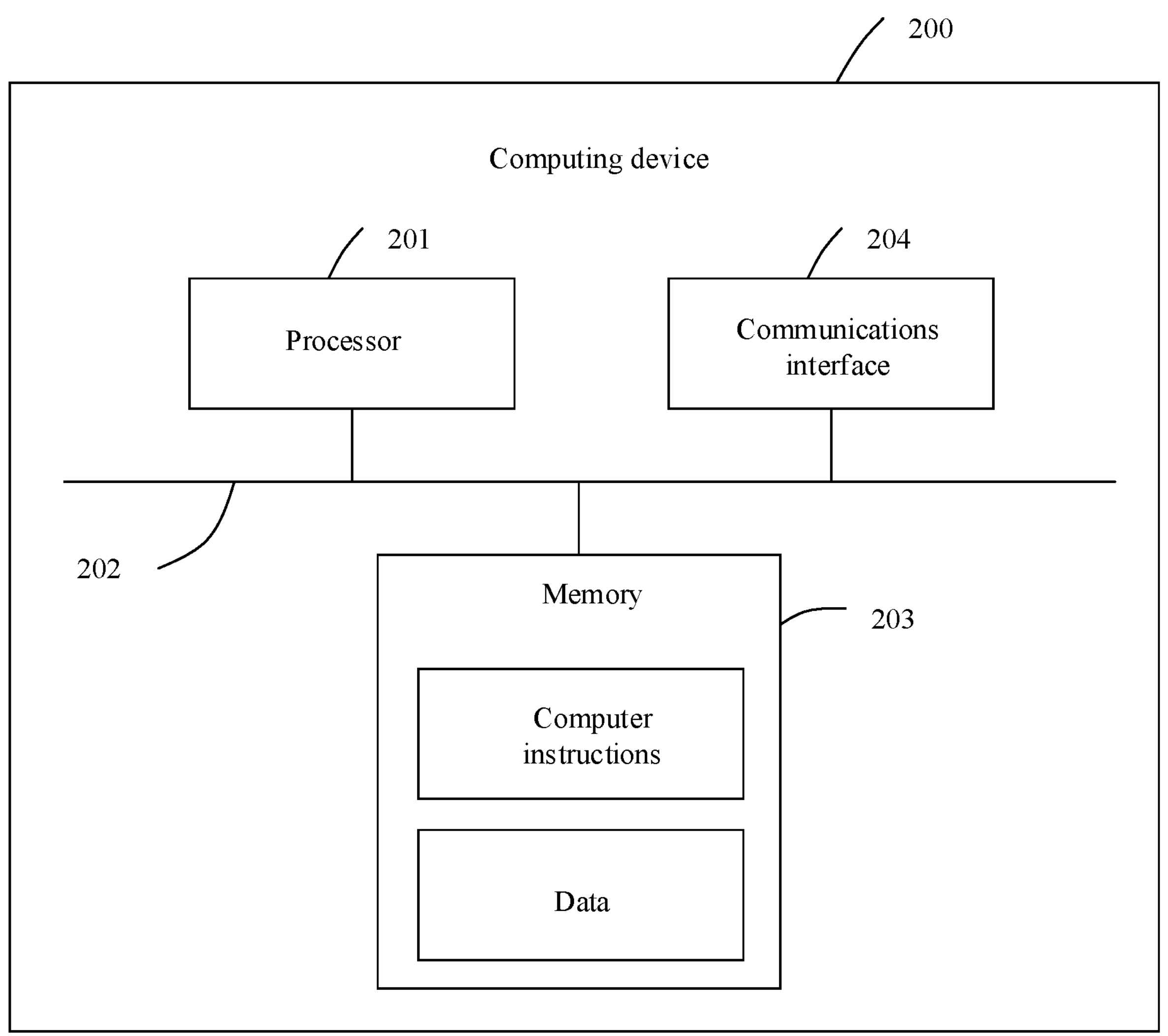
FIG. 2 is a schematic diagram of a structure of a computing device according to an embodiment of this application.

Optionally, the vehicle-mounted terminal device 20 or the software server 30 in FIG. 1 may be implemented by using a computing device 200 in FIG. 2. FIG. 2 is a schematic diagram of a structure of a computing device according to an embodiment of this application. The computing device 200 includes a processor 201, a communications bus 202, a memory 203, and at least one communications interface 204.

The processor 201 may be a general-purpose central processing unit (Central Processing Unit, CPU), an application-specific integrated circuit (application-specific integrated circuit, ASIC), a graphics processing unit (graphics processing unit, GPU), or any combination thereof. The processor 201 may include one or more chips. The processor 201 may include an AI accelerator, for example, a neural network processor (neural processing unit, NPU).

The communications bus 202 may include a path for transferring information between components (for example, the processor 201, the memory 203, and the communications interface 204) of the computing device 200. The communications bus 202 may be a peripheral component interconnect (peripheral component interconnect, PCI) bus, an extended industry standard architecture (extended industry standard architecture, EISA) bus, or the like. The bus may be classified into an address bus, a data bus, a control bus, and the like. For ease of representation, only one line is used to represent the bus in FIG. 2. However, this does not indicate that there is only one bus or one type of bus. The communications bus 202 is configured to connect different components in the computing device 200, so that the different components can communicate with each other.

The memory 203 may be a read-only memory (read-only memory, ROM) or another type of static storage device that can store static information and instructions, may be a random access memory (random access memory, RAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc storage, an optical disc storage (including a compact optical disc, a laser disc, an optical disc, a digital versatile disc, a Blu-ray disc, or the like), a magnetic disk storage medium or another magnetic storage device, or any other medium that can be used for carrying or storing expected program code in a form of an instruction or a data structure and that can be accessed by a computer. However, the memory is not limited thereto. The memory 203 may exist independently, and be connected to the processor 201 by using the communications bus 202. Alternatively, the memory 203 may be integrated with the processor 201.

The memory 203 may store computer instructions. When the computer instructions stored in the memory 203 are executed by the processor 201, the over-the-air upgrade method provided in embodiments of this application can be implemented. In addition, the memory 203 may further store data required by the processor in a process of performing the following method, and intermediate data and/or result data generated in the process.

The communications interface 204 uses any apparatus of a transceiver type, and is configured to communicate with another device or a communications network, such as the Ethernet, a radio access network (RAN), or a wireless local area network (Wireless Local Area Networks, WLAN). For example, a transceiver module may be an apparatus of a transceiver type. Optionally, the communications interface 204 may alternatively be a transceiver circuit located in the processor 201, to implement signal input and signal output of the processor.

During specific implementation, in an embodiment, the processor 201 may include one or more CPUs.

During specific implementation, in an embodiment, the computer device may include a plurality of processors. Each of the processors may be a single-core (single-CPU) processor, or may be a multi-core (multi-CPU) processor. The processor herein may be one or more devices, circuits, and/or processing cores configured to process data (for example, computer program instructions).

Alternatively, optionally, in embodiments of this application, the processor 201 may perform processing-related functions in the over-the-air upgrade method provided in the following embodiments of this application, and the communications interface 204 is responsible for communication with another device or a communications network. This is not specifically limited in embodiments of this application.

Optionally, computer-executable instructions in embodiments of this application may also be referred to as application code. This is not specifically limited in embodiments of this application.

Figure 3:
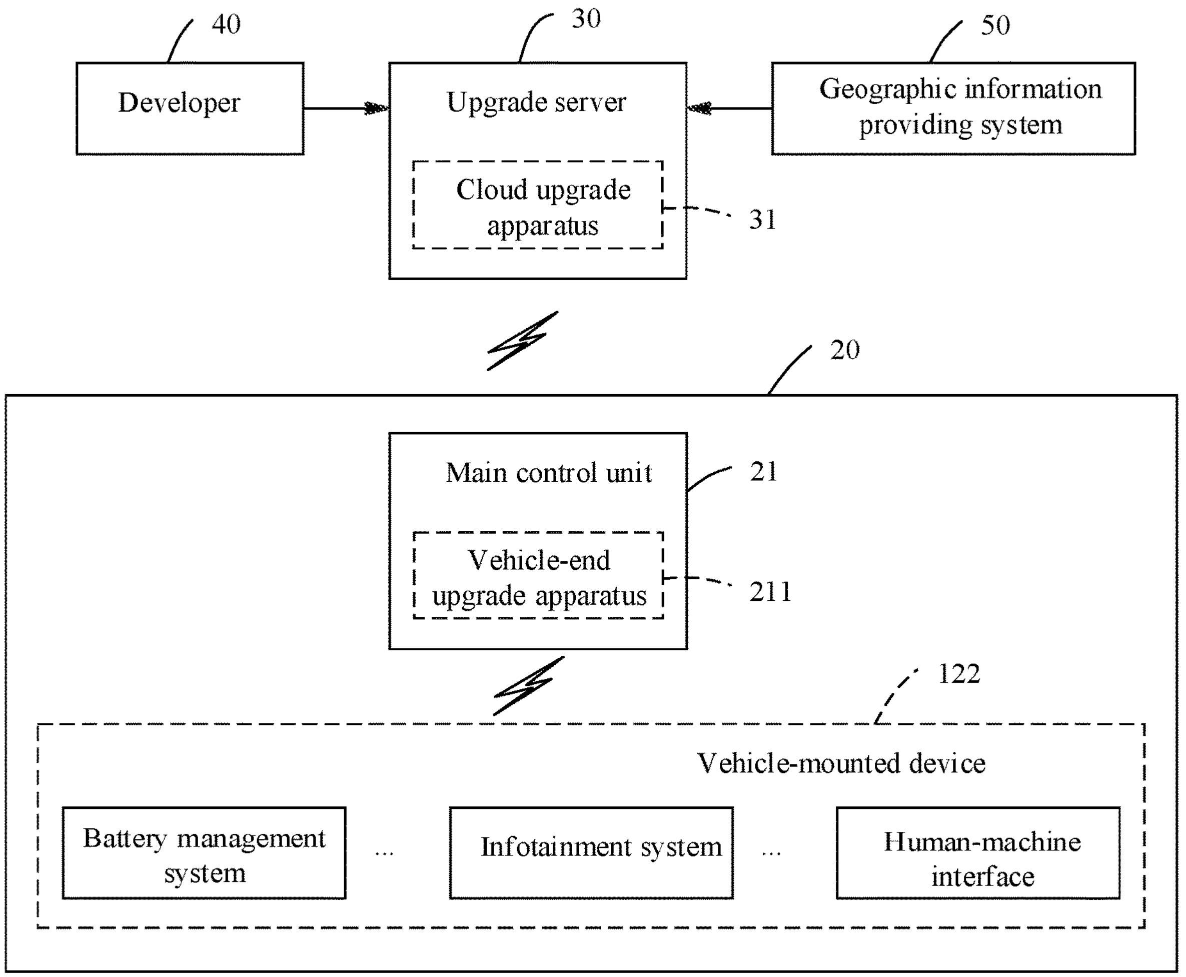
FIG. 3 is a schematic diagram of an over-the-air upgrade application scenario according to an embodiment of this application.

An example in which the vehicle-mounted terminal device 20 is a to-be-upgraded vehicle is used for description. FIG. 3 is a schematic diagram of an over-the-air upgrade application scenario according to an embodiment of this application. The over-the-air upgrade application scenario includes a vehicle-mounted terminal device 20, an upgrade server 30, a developer 40, and a geographic information providing system 50. It can be understood that an over-the-air upgrade application scenario includes but is not limited to the part described in this application, or some parts may be lessened in some scenarios.

A connection is established between the upgrade server 30 and the geographic information providing system 50. The connection between the upgrade server 30 and the geographic information providing system 50 may be established in a wireless or wired manner. A connection is established between the upgrade server 30 and the vehicle-mounted terminal device 20. The connection between the upgrade server 30 and the vehicle-mounted terminal device 20 is established by using a network 500, and connection manners include but are not limited to Wi-Fi, a cellular network, and near field communication (Bluetooth, LoRa, ZigBee, and the like).

The developer 40 provides an upgrade package for the upgrade server 30. The developer 40 may be an original device manufacturer, supplier, or the like. The original device manufacturer or supplier obtains a software package by developing and testing an upgrade program of a firmware/software release, and releases the software package to the upgrade server 30 through a corresponding channel.

It can be understood that the software package is a program or configuration used for upgrading. When an automobile uses an over-the-air (Over the Air, OTA) download technology for upgrading, the upgrading includes firmware upgrading (Firmware-Over-The-Air, FOTA) and software upgrading (Software-Over-The-Air, SOTA). FOTA upgrading is related to hardware, for example, downloading a complete firmware image for an electronic control unit (Electronic Control Unit, ECU) flash of a component, or repairing existing firmware and updating a flash. An ECU may include a central processing unit, a memory (a ROM or a RAM), an input/output (I/O) interface, and the like. SOTA is more related to application software upgrading, for example, updating of an electronic map on a vehicle.

The geographic information providing system 50 is configured to provide geographic information for the upgrade server 30. The geographic information providing system 50 may obtain the geographic information in the following manners: In a first manner, original data material is obtained through field surveying and mapping, investigation and interview, or the like; and the original data material is stored in a database. In this case, the geographic information providing system 50 may be implemented as the database storing the geographic information. In a second manner, a satellite image and an aeronautical image of geographic space are quickly obtained by using space science, computer science, and a remote sensing technology, and such information is identified, converted, stored, transmitted, displayed, and applied at a proper time and a proper place, and is stored in a database. In this case, the geographic information providing system 50 may include a computer obtaining the information, a memory storing the information, and the like. In a third manner, humanistic and economic factor information, such as comprehensive information, maps, charts, and statistical yearbooks of various industries and sectors, or information provided by third-party service providers, is indirectly obtained by using various media. A manner of obtaining the geographic information by the geographic information providing system 50 is not specifically limited in this application.

In a possible implementation thereof, the geographic information providing system 50 may be implemented as a third-party map supplier, for example, Baidu Maps or Amap.

In a possible implementation thereof, the geographic information providing system 50 may be implemented as a geographic information system (Geographical Information System, GIS), that is, a spatial information system supported by computer software and hardware to obtain, store, edit, retrieve, map, analyze, and display data related to spatial and geographic distribution on an entirety or a part of the Earth's surface (including the atmosphere).

It can be understood that the geographic information is a geographic meaning contained and expressed by geographic data. The geographic information belongs to spatial information. Location recognition of the geographic information is associated with data, and a location thereof is identified by using the data. The geographic information is derived from geographic data. The geographic information is a meaning contained in the geographic data, is information about a specific location on the Earth's surface, and is representation of and all useful knowledge about a property, a feature, and a motion status of a geographic entity. The geographic data mainly includes three parts: spatial location data, attribute feature data, and time-domain feature data. The spatial location data describes a location of a geographic object. The location includes both an absolute location of a geographic element (such as terrestrial latitude and longitude coordinates) and a relative location relationship between geographic elements (such as adjacency or inclusion in space). The attribute feature data is a qualitative or quantitative indicator describing a specific geographic element feature, such as a class, a width, a start point, an end point, and a traffic status of a road. The time-domain feature data records a moment at which or a time period in which the geographic data is collected or a geographic phenomenon occurs.

The upgrade server 30 is configured to provide an upgrade service for the vehicle-mounted terminal device 20. The upgrade server 30 may perform upgrade management on a plurality of validly registered vehicle-mounted terminal devices 20. The upgrade server 30 may complete related services such as providing, downloading, and updating an upgrade package. As a cloud service provided by an automobile vendor or a service provider, the upgrade server 30 is responsible for managing an upgrade task and a software upgrade package on the cloud, and delivering, in an OTA manner (such as Wi-Fi/LTE/satellite), the upgrade task and the software upgrade package to the vehicle-mounted terminal device 20 that needs to be upgraded.

For example, the upgrade server 30 may obtain vehicle data from a manufacturing MES system/TSP Internet-of-vehicles platform, and provide an upgrade service for a corresponding vehicle based on the vehicle data. The vehicle data includes unique identification information of the vehicle, information about all ECUs in the vehicle, and vehicle information. It can be understood that a unique identifier of the vehicle may be a vehicle identification number (VIN), a serial number of a telematics box (Telematics BOX, T-BOX) in the vehicle, or the like. The vehicle information includes vehicle model information, vehicle series information, original device manufacturer information, and the like.

For example, the upgrade server 30 is configured to communicate with the vehicle-mounted terminal device 20, to send information to the vehicle-mounted terminal device 20 or receive information from the vehicle-mounted terminal device 20. For example, the upgrade server 30 may provide an upgrade package for the vehicle-mounted terminal device 20. The upgrade package may be a software package file, or may be a file obtained by making and processing a software package. Upgrade package making and processing includes but is not limited to the following operations: file compression and combination, generation of specific file description information, file signing, and encryption processing.

In a possible implementation thereof, the upgrade server 30 obtains current version information of a component of the vehicle-mounted terminal device 20, and automatically or manually generates the upgrade package based on an uploaded upgrade package and the current version information. The upgrade server 30 may further test the upgrade package, and send the tested upgrade package to the corresponding vehicle-mounted terminal device 20.

The upgrade server 30 may further create an upgrade task and manage the upgrade task, including deploying the upgrade task, terminating the upgrade task, suspending the upgrade task, re-running the upgrade task, determining priorities of a plurality of upgrade tasks, and the like.

It can be understood that the upgrade task is a set used by the upgrade server 30 to execute and monitor a group of device upgrade activities. The upgrade task may be aimed at devices in a specific range, to perform management of the whole group of activities, such as upgrade task creation, sending, monitoring, and status maintenance. An upgrade task monitoring function provides feedback on an upgrade task status, progress, and result in the group of upgrade activities. The upgrade task status mainly includes "succeeded", "failed", "updating", and the like. An upgrade task control function provides operation capabilities such as upgrade task starting, stopping, suspending, resuming, restarting, and cancellation in the group of upgrade activities.

It can be understood that the upgrade task is agreeing on an upgrade process of a batch of to-be-upgraded vehicles. For the upgrade task, which vehicle-mounted devices 22 (components) of which vehicles need to be upgraded, what notification needs to be sent to a user before the upgrade, what content is to be indicated to the user, and the like are usually agreed on. After the upgrade task is released, the vehicle-mounted terminal device 20 receives a corresponding upgrade message. After detecting the upgrade task, the upgrade server 30 triggers determining whether to provide the upgrade service, that is, performs the over-the-air upgrade method provided in embodiments of this application, to determine whether to provide the upgrade service for the vehicle-mounted terminal device 20, that is, whether to provide the upgrade service for a to-be-upgraded vehicle or a batch of to-be-upgraded vehicles.

In a possible implementation thereof, the upgrade server 30 may include a cloud upgrade apparatus 31. The cloud upgrade apparatus 31 includes a processor. The processor is configured to execute a computer program. When the computer program is executed, the processor is configured to perform a procedure of the over-the-air upgrade method provided in this application. By using the cloud upgrade apparatus 31, the upgrade server 30 cooperates with the vehicle-mounted terminal device 20 and the geographic information providing system 50, to perform the procedure of the over-the-air upgrade method provided in this application.

The cloud upgrade apparatus 31 is configured to obtain location information of the to-be-upgraded vehicle, and provide the upgrade service based on a location relationship between the to-be-upgraded vehicle and a predefined area. The predefined area includes one or more of a dangerous area and a safe area. The dangerous area is used to indicate an area in which upgrading is not allowed, and the safe area is used to indicate an area in which upgrading is allowed.

Specifically, the cloud upgrade apparatus 31 is configured to: obtain the location information of the to-be-upgraded vehicle in the upgrade task when the upgrade task is detected; determine an area attribute of a location of the to-be-upgraded vehicle based on the location of the to-be-upgraded vehicle, where the area attribute includes the dangerous area or the safe area; and when the to-be-upgraded vehicle is located in the safe area, provide the upgrade service for the to-be-upgraded vehicle; or when the to-be-upgraded vehicle is located in the dangerous area or within a specific range from the dangerous area, suspend providing the upgrade service.

The cloud upgrade apparatus 31 is configured to properly and accurately control the upgrade server 30 to provide the upgrade service, so that the vehicle-mounted terminal device 20 performs upgrading in a suitable environment, where the suitable environment includes but is not limited to a suitable time and/or a suitable place and/or a suitable state of the vehicle. For the upgrade server 30, an upgrade procedure of the upgrade server 30 may include upgrade push, a phase before upgrade download, downloading, a phase before installation, installing, and the like. The cloud upgrade apparatus 31 controls, by controlling the upgrade procedure, the upgrade server 30 to provide the upgrade service, thereby controlling an upgrade of the vehicle in an upgrade package push, upgrade package download, or installation flushing phase of the upgrade server 30.

In a possible implementation thereof, the cloud upgrade apparatus 31 obtains geographic information from the geographic information providing system 50, and determines the area attribute of the location of the to-be-upgraded vehicle based on the geographic information and the location of the to-be-upgraded vehicle.

In a possible implementation thereof, the cloud upgrade apparatus 31 may define the area attribute of the location of the to-be-upgraded vehicle in one or more of the following manners: when the location of the to-be-upgraded vehicle is a lane area, determining that the area attribute of the location of the to-be-upgraded vehicle is the dangerous area; when the location of the to-be-upgraded vehicle is a congested area, determining that the area attribute of the location of the to-be-upgraded vehicle is the dangerous area; or when the location of the to-be-upgraded vehicle is a slow-moving area, determining that the area attribute of the location of the to-be-upgraded vehicle is the dangerous area. In this embodiment of this application, in an entire area or an entire electronic map, an area other than the dangerous area may be defined as the safe area, or a third area may be set. A user may determine whether to perform upgrading in the third area. This is not specifically limited in this application.

The vehicle-mounted terminal device 20 is configured to communicate with the upgrade server 30, receive the upgrade package provided by the upgrade server 30, and perform upgrading based on the upgrade package. The vehicle-mounted terminal device 20 may include a main control unit 21 and at least one vehicle-mounted device 22. The main control unit 21 is configured to communicate with the upgrade server 30, and manage and assist in upgrading of the at least one vehicle-mounted device 22. The main control unit 21 may be implemented as a T-box, or the main control unit 21 may be implemented as a logical function entity, and the logical function entity may be disposed on a device such as a gateway. The main control unit 21 is further configured to be responsible for communicating with the to-be-upgraded vehicle-mounted device 22 in the vehicle, to manage and assist in an upgrade/update process of the vehicle-mounted device 22. For example, the main control unit 21 controls to distribute a firmware update to the corresponding vehicle-mounted device 22, and notifies the vehicle-mounted device 22 of when the update is to be executed. The main control unit 21 may include but is not limited to a processor and a related volatile memory RAM and non-volatile memory, and may further include a network interface configured to communicate with another vehicle-mounted device 22 by using a CAN bus or another in-vehicle network. The memory may be configured to store an over-the-air upgrade management program, to manage an upgrade process, for example, determine a status of the vehicle-mounted terminal device 20, and further determine, based on the status of the vehicle-mounted terminal device 20, whether an upgrade condition is met. The memory may further store a table. The table includes related information of a vehicle-mounted device 22 in each to-be-upgraded vehicle, for example, a number of the vehicle-mounted device 22 and a current firmware version. This helps an upgrade agent unit verify a received firmware upgrade package and ensure that the firmware upgrade package is authorized. If the vehicle-mounted device 22 that is being updated has no encryption capability, the upgrade agent unit also needs to be responsible for decoding and signature verification of an update process. The vehicle-mounted device 22 may include a human-machine interface (Human Machine Interface, HMI), a battery management system (BATTERY MANAGEMENT SYSTEM, BMS), an infotainment system, and the like. The vehicle-mounted device 22 may include a microcontroller (Microcontroller), a CAN controller (CAN controller), and a transceiver (Transceiver). The vehicle-mounted device 22 communicates with the in-vehicle network by using the transceiver, the CAN controller is configured to implement a CAN protocol, and the microcontroller is configured to implement pre-upgrade and post-upgrade computing. The transceiver receives an upgrade package file sent by the main control unit 21, and safe upgrading is performed after a micro control unit performs a safety check.

In a possible implementation thereof, the vehicle-mounted device 22 may further include a positioning system. The positioning system is mainly a global navigation satellite system (Global Navigation Satellite System, GNSS) system, for example, a BeiDou navigation satellite system (BeiDou Navigation Satellite System, BDS), a global positioning system (Global Positioning System, GPS), a GLONASS (GLOBAL NAVIGATION SATELLITE SYSTEM, GLONASS), or a Galileo satellite navigation system (Galileo satellite navigation system, Galileo).

In a possible implementation thereof, the vehicle-mounted terminal device 20 may further include a vehicle-end upgrade apparatus 21. The vehicle-end upgrade apparatus 21 is implemented as a logical function entity. Alternatively, the vehicle-end upgrade apparatus 21 includes a processor. The processor is configured to execute a computer program. When the computer program is executed, the processor is configured to perform a procedure of the over-the-air upgrade method provided in this application.

The vehicle-end upgrade apparatus 21 is configured to obtain the location information of the to-be-upgraded vehicle, and perform an upgrade operation based on the location relationship between the to-be-upgraded vehicle and the predefined area. The predefined area includes one or more of the dangerous area and the safe area. The dangerous area is used to indicate the area in which upgrading is not allowed, and the safe area is used to indicate the area in which upgrading is allowed.

Specifically, the cloud upgrade apparatus 31 is configured to: obtain the location information of the to-be-upgraded vehicle in the upgrade task when the upgrade task sent by the upgrade server 30 is detected; and determine the area attribute of the location of the to-be-upgraded vehicle based on the location of the to-be-upgraded vehicle, where the area attribute includes the dangerous area or the safe area. When the to-be-upgraded vehicle is located in the safe area, the upgrade operation is performed; or when the to-be-upgraded vehicle is located in the dangerous area or within the specific range from the dangerous area, the upgrade operation is suspended.

The cloud upgrade apparatus 31 is configured to properly and accurately control an upgrade of the vehicle-mounted terminal device 20, so that the vehicle-mounted terminal device 20 performs upgrading in a suitable environment, where the suitable environment includes but is not limited to a suitable time and/or a suitable place and/or a suitable state of the vehicle. To be specific, for the vehicle-mounted terminal device 20, an upgrade procedure of the vehicle-mounted terminal device 20 may include requesting upgrade permission from a user, a phase before upgrade download, downloading, a phase before installation, installing, and the like. The cloud upgrade apparatus 31 controls, by controlling the upgrade procedure, the vehicle-mounted terminal device 20 to perform the upgrade operation, for example, upgrading of the vehicle-mounted terminal device 20 in a phase of requesting upgrade permission from the user, upgrade package download, or installation flushing.

Optionally, the cloud upgrade apparatus 31 obtains the geographic information from the upgrade server 30, and determines the area attribute of the location of the to-be-upgraded vehicle based on the geographic information and the location of the to-be-upgraded vehicle.

Optionally, the cloud upgrade apparatus 31 may define the area attribute of the location of the to-be-upgraded vehicle in one or more of the following manners: when the location of the to-be-upgraded vehicle is a lane area, determining that the area attribute of the location of the to-be-upgraded vehicle is the dangerous area; when the location of the to-be-upgraded vehicle is a congested area, determining that the area attribute of the location of the to-be-upgraded vehicle is the dangerous area; or when the location of the to-be-upgraded vehicle is a slow-moving area, determining that the area attribute of the location of the to-be-upgraded vehicle is the dangerous area.

It can be understood that the cloud upgrade apparatus 31 in the upgrade server 30 and the vehicle-end upgrade apparatus 211 in the vehicle-mounted terminal device 20 may coexist, or one of the two upgrade apparatuses may exist.

For implementation of this application, the following briefly describes a working process of the foregoing over-the-air upgrade application scenario.

The developer 40 delivers the corresponding software package to the upgrade server 30. The upgrade server 30 creates the upgrade task, determines the to-be-upgraded vehicle and the corresponding to-be-upgraded vehicle-mounted device 22, and triggers the upgrade to the corresponding vehicle-mounted terminal device 20 based on an ID number of the to-be-upgraded vehicle in the upgrade task. The upgrade server 30 detects the upgrade task, and the upgrade server 30 obtains the location information of the to-be-upgraded vehicle. The upgrade server 30 obtains the electronic map from the geographic information providing system 50, obtains the geographic information from the electronic map, and then determines the area attribute of the location of the to-be-upgraded vehicle based on the location information of the to-be-upgraded vehicle and the location of the to-be-upgraded vehicle.

When the area attribute of the location of the to-be-upgraded vehicle is the safe area, the upgrade server 30 provides the upgrade service for the to-be-upgraded vehicle, and sends an upgrade request instruction to the main control unit 21 of the vehicle-mounted terminal device 20 or sends the upgrade package to the vehicle-mounted terminal device 20 based on an ID of the vehicle-mounted terminal device 20. The main control unit 21 of the vehicle-mounted terminal device 20 generates corresponding upgrade notification information based on the request instruction, where the upgrade notification information is used to provide, for the user by using an application layer, a choice of whether to perform upgrading, and the user may enter an instruction of "upgrade now" or "later". A central processing unit of the vehicle-mounted terminal device 20 sends the upgrade notification information to an application program of the vehicle-mounted terminal device 20. The application program generates corresponding visual upgrade notification information based on the upgrade notification information, and then displays the corresponding upgrade notification information by using the human-machine interface. The user enters a corresponding operation on the human-machine interface. After receiving an upgrade confirmation instruction entered by the user, the application program sends the upgrade confirmation instruction to the central processing unit. The central processing unit sends an upgrade package download instruction to the main control unit 21 based on the upgrade confirmation instruction. The main control unit 21 sends the upgrade package download instruction to the upgrade server 30. The upgrade server 30 sends the upgrade package to the main control unit 21 based on the ID of the vehicle-mounted terminal device 20, to perform upgrading based on the upgrade package.

When the area attribute of the location of the to-be-upgraded vehicle is the dangerous area, the upgrade server 30 suspends providing the upgrade service, that is, the upgrade server 30 does not send the upgrade request instruction to the to-be-upgraded vehicle or send the upgrade package to the to-be-upgraded vehicle. Alternatively, the upgrade server 30 provides the upgrade service for the to-be-upgraded vehicle, sends a corresponding upgrade notification to the main control unit 21 of the vehicle-mounted terminal device 20 based on the ID of the vehicle-mounted terminal device 20, and indicates that the vehicle is currently not suitable for upgrading.

The following describes the over-the-air upgrade method provided in embodiments of this application.

In this application, operations performed by an apparatus or a device according to embodiments of this application are described by using a flowchart. It should be understood that previous or following operations are not necessarily performed precisely in a sequence. Instead, depending on a requirement, various steps may be processed in reverse order or simultaneously. In addition, another operation may be added to these processes, or one or more operation steps may be removed from these processes.

FIG. 4 is a schematic flowchart of an over-the-air upgrade method according to an embodiment of this application. The over-the-air upgrade method may be performed by the foregoing upgrade server. The method includes the following steps.

Step S401: Obtain location information of a to-be-upgraded vehicle.

In this embodiment of this application, cases in which the upgrade server is triggered to obtain the location information of the to-be-upgraded vehicle include but are not limited to the following:

In a first case, the to-be-upgraded vehicle actively queries a version. For example, the to-be-upgraded vehicle sends a version query request to the upgrade server. The version query request includes an ID of the to-be-upgraded vehicle and a current version number of the to-be-upgraded vehicle. The upgrade server queries, based on the version query request, whether a version number of an upgrade package is later than the current version number of the to-be-upgraded vehicle. If there is an upgrade package of a later version, the upgrade server obtains the location information of the to-be-upgraded vehicle.

In a second case, after receiving an upgrade package sent by a developer, the upgrade server creates an upgrade task. In the upgrade task, the to-be-upgraded vehicle may be specified, where a batch of to-be-upgraded vehicles may be specified, or one to-be-upgraded vehicle may be specified. The upgrade server obtains a version number of the to-be-upgraded vehicle in the upgrade task, and then queries whether a version number of the upgrade package is later than the current version number of the to-be-upgraded vehicle. If there is an upgrade package of a later version, the upgrade server obtains the location information of the to-be-upgraded vehicle, that is, obtains the location information of the to-be-upgraded vehicle before pushing an upgrade message to the to-be-upgraded vehicle.

In a third case, after the upgrade server pushes an upgrade message to the to-be-upgraded vehicle and receives an upgrade confirmation instruction from a user, the upgrade server obtains the location information of the to-be-upgraded vehicle.

In a fourth case, before the upgrade server sends an upgrade package download address to the to-be-upgraded vehicle, the upgrade server obtains the location information of the to-be-upgraded vehicle.

In a fifth case, after the upgrade server sends an upgrade package download address to the to-be-upgraded vehicle, the upgrade server obtains the location information of the to-be-upgraded vehicle.

In a sixth case, before the upgrade server sends an upgrade package to the to-be-upgraded vehicle, the upgrade server obtains the location information of the to-be-upgraded vehicle.

In a seventh case, after the upgrade server sends an upgrade package to the to-be-upgraded vehicle, the upgrade server obtains the location information of the to-be-upgraded vehicle.

It can be understood that the over-the-air upgrade method in this embodiment of this application may be applicable to a case before the to-be-upgraded vehicle performs an upgrade operation. Before the to-be-upgraded vehicle performs the upgrade operation, the location information of the to-be-upgraded vehicle is obtained, to perform the over-the-air upgrade method in this embodiment of this application.

In this embodiment of this application, for obtaining the location information of the to-be-upgraded vehicle, the upgrade server may actively query the to-be-upgraded vehicle for the location information of the to-be-upgraded vehicle, or may obtain, in a process of interacting with the to-be-upgraded vehicle, the location information actively sent by the to-be-upgraded vehicle.

In this embodiment of this application, the obtaining location information of a to-be-upgraded vehicle may be obtaining location information of one to-be-upgraded vehicle, or may be obtaining location information of a batch of to-be-upgraded vehicles. The location information may be understood as geographic location information, and the location information includes geographic location coordinates, such as latitude and longitude values. The location information may further include geographic information. The geographic information may include that current geographic location coordinates correspond to a road, a residential district, or the like, and may further include road condition information corresponding to the geographic location coordinates, for example, the current road is congested, requires slow moving, has a traffic accident, or is being repaired.

Step S402: Provide an upgrade service based on a location relationship between the to-be-upgraded vehicle and a predefined area.

In this embodiment of this application, after the location information of the to-be-upgraded vehicle is obtained, whether to provide the upgrade service for the to-be-upgraded vehicle may be determined. Specifically, whether to provide the upgrade service is determined based on the location relationship between the to-be-upgraded vehicle and the predefined area. The predefined area includes one or more of a dangerous area and a safe area. The dangerous area is used to indicate an area in which upgrading is not allowed, and the safe area is used to indicate an area in which upgrading is allowed.

In this embodiment of this application, the determining, based on the location relationship between the to-be-upgraded vehicle and the predefined area, whether to provide the upgrade service may specifically include: determining an area attribute of a location of the to-be-upgraded vehicle based on the location of the to-be-upgraded vehicle, and then determining, based on the area attribute of the location of the to-be-upgraded vehicle, whether to provide the upgrade service. The area attribute includes the safe area or the dangerous area.

In this embodiment of this application, the determining an area attribute of a location of the to-be-upgraded vehicle based on the location of the to-be-upgraded vehicle may specifically include: determining the area attribute of the location of the to-be-upgraded vehicle based on geographic information of the location of the to-be-upgraded vehicle, where the geographic information is a geographic meaning contained and expressed by geographic data. Geographic information belongs to spatial information. Location recognition of geographic information is associated with data, and a location thereof is identified by using the data. Geographic information is derived from geographic data. Geographic information is a meaning contained in geographic data, is information about a specific location on the Earth's surface, and is representation of and all useful knowledge about a property, a feature, and a motion status of a geographic entity. Geographic data mainly includes three parts: spatial location data, attribute feature data, and time-domain feature data. The spatial location data describes a location of a geographic object. The location includes both an absolute location of a geographic element (such as terrestrial latitude and longitude coordinates) and a relative location relationship between geographic elements (such as adjacency or inclusion in space). The attribute feature data is a qualitative or quantitative indicator describing a specific geographic element feature, such as a class, a width, a start point, an end point, and a traffic status of a road. The time-domain feature data records a moment at which or a time period in which the geographic data is collected or a geographic phenomenon occurs. Geographic information may include a geographic location (for example, latitude and longitude) and an attribute feature (for example, a road or a road condition) of a local area.

In this embodiment of this application, the determining an area attribute of a location of the to-be-upgraded vehicle based on the location of the to-be-upgraded vehicle, that is, the determining the area attribute of the location of the to-be-upgraded vehicle based on geographic information of the location of the to-be-upgraded vehicle may specifically include one or more of the following manners: when the location of the to-be-upgraded vehicle is a lane area, determining that the area attribute of the location of the to-be-upgraded vehicle is the dangerous area; when the location of the to-be-upgraded vehicle is a congested area, determining that the area attribute of the location of the to-be-upgraded vehicle is the dangerous area; or when the location of the to-be-upgraded vehicle is a slow-moving area, determining that the area attribute of the location of the to-be-upgraded vehicle is the dangerous area.

In this embodiment of this application, a definition of the area attribute is related to the geographic information. In other words, definitions of the dangerous area and the safe area are related to the geographic information. For example, a highway, an urban expressway, an urban arterial road, a motor lane, and the like may be defined as dangerous areas. Upgrading in the dangerous area may bring a comparatively high risk to traffic safety and driving of the vehicle. An area other than the dangerous area may be defined as the safe area.

For example, the upgrade server may determine a relationship between the geographic information and the safe area and/or dangerous area based on Table 1 below, and then define a specific geographic area based on the obtained geographic information.

TABLE 1

| Highway | Urban expressway | Parking lot | Residential quarter | Motor lane | Urban arterial road |
|---|---|---|---|---|---|
| Dangerous area | Dangerous area | Safe area | Safe area | Dangerous area | Dangerous area |

In this embodiment of this application, the area attribute may define only the safe area, or may define only the dangerous area, or define both the safe area and the dangerous area, or define a third area between the dangerous area and the safe area. This is not specifically limited in this application.

In this embodiment of this application, the determining the area attribute of the location of the to-be-upgraded vehicle based on geographic information of the location of the to-be-upgraded vehicle includes: directly obtaining the geographic information of the location of the to-be-upgraded vehicle from the location information of the to-be-upgraded vehicle, and then determining the area attribute of the location of the to-be-upgraded vehicle based on the geographic information.

For example, when the location information of the to-be-upgraded vehicle includes location coordinates of the to-be-upgraded vehicle and geographic information corresponding to the location coordinates, for example, the location coordinates of the to-be-upgraded vehicle are (X, Y), where X may represent a longitude value, Y may represent a latitude value, and the geographic information corresponding to the location coordinates (X, Y) is that the location coordinates (X, Y) correspond to an XX road, it may be determined that the area attribute of the location of the to-be-upgraded vehicle is the dangerous area.

In this embodiment of this application, the determining the area attribute of the location of the to-be-upgraded vehicle based on geographic information of the location of the to-be-upgraded vehicle includes: determining the area attribute of the location of the to-be-upgraded vehicle based on geographic information of an area in which the to-be-upgraded vehicle is located and location coordinates of the to-be-upgraded vehicle.

For example, when the location information of the to-be-upgraded vehicle includes only the location coordinates of the to-be-upgraded vehicle, the geographic information of the area in which the to-be-upgraded vehicle is located is obtained, and the area attribute of the location of the to-be-upgraded vehicle is obtained based on the location coordinates of the to-be-upgraded vehicle and the geographic information of the area. For example, the location coordinates of the to-be-upgraded vehicle are (X, Y). In this case, geographic information of an area corresponding to the location coordinates (X, Y), such as geographic information of a city corresponding to the location coordinates (X, Y) or geographic information of a province corresponding to the location coordinates (X, Y), is obtained. The geographic information corresponding to the location coordinates (X, Y) is determined based on the geographic information of the city corresponding to the location coordinates (X, Y). Specifically, the location coordinates (X, Y) of the to-be-upgraded vehicle are obtained, and a map of the area in which the to-be-upgraded vehicle is located, such as a municipal map, a provincial map, a national map, or a global map, is obtained. The geographic information is extracted from the map. The geographic information may include a geographic location, road condition information based on the geographic location, and the like. The road condition information may include, for example, a class, a width, a start point, and an end point of a road section, and may further include a traffic status or the like of the road section. Attribute data of a road section may be further obtained with reference to a time segment. For example, for a road section in front of a school gate, a traffic status of the road section is comparatively crowded when students go to school or return home, and a traffic status of the road section is good when it is not time for students to go to school or return home. Then, the location coordinates (X, Y) of the to-be-upgraded vehicle are compared with the municipal map, and the geographic information corresponding to the location coordinates (X, Y) of the to-be-upgraded vehicle is determined, so that whether the location coordinates (X, Y) of the to-be-upgraded vehicle correspond to a road can be determined, and road condition information or the like can be obtained if the location coordinates (X, Y) correspond to the road.

In this embodiment of this application, the determining the area attribute of the location of the to-be-upgraded vehicle based on geographic information of the location of the to-be-upgraded vehicle includes: determining the area attribute of the location of the to-be-upgraded vehicle based on an area attribute classification of an area in which the to-be-upgraded vehicle is located and location coordinates of the to-be-upgraded vehicle.

For example, the area attribute classification of the area in which the to-be-upgraded vehicle is located may be implemented by using a geo-fencing technology. A virtual geographic boundary is obtained through enclosure by using a virtual fence, and area attributes of all enclosed virtual geographic boundaries are defined, that is, the safe area and/or the dangerous area are/is defined on an electronic map. For example, the upgrade server obtains an electronic map of the area in which the to-be-upgraded vehicle is located, or a vehicle-mounted terminal device obtains an electronic map of the area in which the to-be-upgraded vehicle is located, and obtains areas through division on the electronic map, for example, obtains a virtual geographic boundary through enclosure by using a virtual fence. The upgrade server obtains a virtual geographic boundary by enclosing a lane area on the electronic map by using a virtual fence, and defines the lane area as the dangerous area. Alternatively, the upgrade server obtains a virtual geographic boundary by enclosing a residential district on the electronic map by using a virtual fence, and defines the residential district as the safe area. The rest may be deduced by analogy. In this way, each safe area and/or dangerous area are/is defined on the electronic map of the area in which the to-be-upgraded vehicle is located. Then, the area attribute of the location of the to-be-upgraded vehicle may be obtained based on which area the to-be-upgraded vehicle is located in, for example, the to-be-upgraded vehicle is located in an area defined as the dangerous area on the electronic map.

In this embodiment of this application, a "virtual fence" is defined in geographic space, and corresponds to a geographic area. When the vehicle-mounted terminal device enters or leaves the area, the vehicle-mounted terminal device or the upgrade server may receive a notification, or a related mobile Internet service is triggered, for example, upgrading is allowed in the safe area, and upgrading is not allowed in the dangerous area.

In this embodiment of this application, if the upgrade server defines the safe area, a location relationship between the location of the to-be-upgraded vehicle and the safe area is calculated. If the location of the to-be-upgraded vehicle is within a boundary of the safe area, the to-be-upgraded vehicle is located in the safe area.

In this embodiment of this application, if the upgrade server defines the dangerous area, a location relationship between the location of the to-be-upgraded vehicle and the dangerous area is calculated. If the location of the to-be-upgraded vehicle is within a boundary of the dangerous area, the to-be-upgraded vehicle is located in the dangerous area. If the location of the to-be-upgraded vehicle is not within a boundary of the dangerous area, but a shortest distance between the location of the to-be-upgraded vehicle and the dangerous area for upgrading is less than a preset threshold, the to-be-upgraded vehicle is to be located in the dangerous area. If the location of the to-be-upgraded vehicle is not within a boundary of the dangerous area, but a driving direction of the to-be-upgraded vehicle is toward the dangerous area, the to-be-upgraded vehicle is to be located in the dangerous area. In all of the foregoing cases, the area attribute of the location of the to-be-upgraded vehicle may be determined as the dangerous area. Being within a specific range from the dangerous area is used to indicate that the to-be-upgraded vehicle is located in a non-dangerous area, for example, located in the third area, but the to-be-upgraded vehicle is to run to the dangerous area or is to be located in the dangerous area. In this case, the safe area and the dangerous area do not completely overlap.

In this embodiment of this application, when it is determined that the area attribute of the location of the to-be-upgraded vehicle is the safe area, that is, when the to-be-upgraded vehicle is located in the safe area, the upgrade operation is performed. The providing an upgrade service for the to-be-upgraded vehicle includes but is not limited to the following cases: If upgrade service providing has not started, the upgrade service is provided for the to-be-upgraded vehicle when the to-be-upgraded vehicle is located in the safe area; or if the upgrade service has been provided, but upgrade service providing is interrupted, the upgrade service continues to be provided for the to-be-upgraded vehicle when the to-be-upgraded vehicle is located in the safe area.

In this embodiment of this application, when it is determined that the area attribute of the location of the to-be-upgraded vehicle is the dangerous area, that is, when the to-be-upgraded vehicle is located in the dangerous area or within the specific range from the dangerous area, upgrade service providing is suspended. Suspending providing the upgrade service includes but is not limited to the following: If upgrade service providing has not started, the upgrade service is not provided when the to-be-upgraded vehicle is located in the dangerous area or within the specific range from the dangerous area, that is, upgrade service providing is not started for the to-be-upgraded vehicle at all. Alternatively, if the upgrade service has been provided, or the upgrade service is being provided currently, upgrade service providing is interrupted when the to-be-upgraded vehicle is located in the dangerous area or within the specific range from the dangerous area. Being within the specific range from the dangerous area means that the safe area and the dangerous area may not completely overlap, and there is a specific interval between the areas, for example, the third area exists.

In this embodiment of this application, the upgrade service includes one or more of the following services: pushing an upgrade message to the to-be-upgraded vehicle, or sending an upgrade package download address to the to-be-upgraded vehicle, or sending an upgrade package to the to-be-upgraded vehicle.

For example, the providing an upgrade service for the to-be-upgraded vehicle includes the following cases: If upgrade service providing has not started, the upgrade message is pushed to the to-be-upgraded vehicle when the to-be-upgraded vehicle is located in the safe area. If the upgrade service has been provided for the to-be-upgraded vehicle, for example, the upgrade message has been pushed to the to-be-upgraded vehicle, but upgrade service providing is interrupted, when the to-be-upgraded vehicle is located in the safe area, the upgrade message may continue to be pushed to the to-be-upgraded vehicle, or the upgrade package download address may continue to be sent to the to-be-upgraded vehicle, or the upgrade package may continue to be sent to the to-be-upgraded vehicle.

For example, suspending providing the upgrade service for the to-be-upgraded vehicle includes the following cases: If upgrade service providing has not started, the upgrade message is not pushed to the to-be-upgraded vehicle when the to-be-upgraded vehicle is located in the dangerous area or within the specific range from the dangerous area. If the upgrade service has been provided for the to-be-upgraded vehicle, for example, the upgrade message has been pushed to the to-be-upgraded vehicle, when the to-be-upgraded vehicle is located in the dangerous area or within the specific range from the dangerous area, pushing the upgrade message to the to-be-upgraded vehicle is suspended, or sending the upgrade package download address to the to-be-upgraded vehicle is suspended, or sending the upgrade package to the to-be-upgraded vehicle is suspended.

In this embodiment of this application, when the to-be-upgraded vehicle is located in the dangerous area or within the specific range from the dangerous area, providing the upgrade service for the to-be-upgraded vehicle is delayed until the to-be-upgraded vehicle is located in the safe area. To be specific, in a process of providing the upgrade service for the to-be-upgraded vehicle, the upgrade server also obtains the location information of the to-be-upgraded vehicle in real time, determines the area attribute of the current location of the to-be-upgraded vehicle, and when the to-be-upgraded vehicle is located in the dangerous area or within the specific range from the dangerous area, delays providing the upgrade service for the to-be-upgraded vehicle, until the to-be-upgraded vehicle is located in the safe area. Further, when the upgrade server delays providing the upgrade service for the to-be-upgraded vehicle, a warning notification may appear, to notify the user that the vehicle is currently not suitable for upgrading.

In this embodiment of this application, after the safe area and/or the dangerous area are/is defined, information about each area, including boundary information, may be obtained. For example, a virtual geographic boundary may be obtained by enclosing each area by using a geo-fencing technology. The safe area is determined by the boundary of the safe area, and the dangerous area is determined by the boundary of the dangerous area. It can be understood that determining the boundary of the safe area is determining the safe area, and determining the boundary of the dangerous area is determining the dangerous area.

In this embodiment of this application, the upgrade server may obtain boundary information, including a geographic location (longitude and latitude), a shape, and the like, of each area. For example, if the safe area is round, latitude and longitude of a center of the safe area and a radius of the safe area may be obtained. The boundary of the safe area may be determined based on a location of the center and the radius, to obtain an area and a range of the safe area. If the safe area is a polygon, a shape, an area, and a range of the polygon may be determined based on locations of connection points between sides of the polygon. Shapes of the safe area and/or the dangerous area include but are not limited to a polygon and a circle.

In this embodiment of this application, a boundary of one or more of the dangerous area and the safe area is adjustable, and the boundary of the safe area and/or the boundary of the dangerous area may be changed. The boundary of the safe area and the boundary of the dangerous area are dynamically changed to adapt to different situations.

In a possible implementation thereof, that a boundary of one or more of the dangerous area and the safe area is adjustable specifically includes: the boundary of the dangerous area or the boundary of the safe area is adjusted based on real-time information received in real time, where the real-time information includes one or more of information that affects a definition of the boundary of the dangerous area and information that affects a definition of the boundary of the safe area, and the real-time information further includes one or more of the following pieces of information: a risk of the upgrade task, current road condition information, and positioning precision of the to-be-upgraded vehicle. In this way, the boundary of the safe area, or the boundary of the dangerous area, or the boundary of the safe area and the boundary of the dangerous area can be dynamically changed based on the received real-time information.

In a possible implementation thereof, the real-time information is related to precision of the electronic map and/or the positioning precision of the to-be-upgraded vehicle. For example, dangerous areas and safe areas of different precision are defined based on the precision of the electronic map and/or the positioning precision of the to-be-upgraded vehicle, that is, dangerous areas and safe areas of different ranges are defined based on the precision of the electronic map and/or the positioning precision of the to-be-upgraded vehicle. When the precision of the electronic map is insufficient or the positioning precision of the to-be-upgraded vehicle is insufficient, precision of defining the dangerous area is also reduced, and the boundary of the dangerous area is expanded. For example, the dangerous area may be defined as an entire highway, urban expressway, or arterial road range. When the precision of the electronic map is comparatively high and/or the positioning precision of the to-be-upgraded vehicle is comparatively high, precision of defining the dangerous area is also reduced, and the boundary of the dangerous area is reduced. For example, a motor lane in an entire urban road is defined as the dangerous area, and a non-motor lane is the safe area.

In this embodiment of this application, when the precision of the electronic map and/or the positioning precision of the to-be-upgraded vehicle are/is high, a more precise boundary of the dangerous area can be defined, so that a limitation on upgrade space can be reduced. If the precision of the electronic map and/or the positioning precision of the to-be-upgraded vehicle are/is comparatively low, a defined dangerous area range is comparatively large, so that upgrade safety can be ensured. Defining dangerous areas of different precision can adapt to different precision of electronic maps and different positioning precision of to-be-upgraded vehicles, thereby improving adaptability.

In a possible implementation thereof, the real-time information is dynamically related to the road condition information of the area in which the to-be-upgraded vehicle is located. For example, the boundary of the dangerous area is dynamically expanded or reduced based on the road condition information. For example, an area with severe traffic congestion is defined as the dangerous area, and a boundary of such a dangerous area is expanded. An area with some traffic congestion is defined as the dangerous area, and when traffic congestion is relieved, the area is defined as the safe area. For example, in time segments not for students to go to school or return home, a road area at a school gate is defined as the safe area; and in time segments for students to go to school and return home, the road area at the school gate is defined as the dangerous area. This avoids traffic congestion aggravation caused by a problem in an upgrade process, and reduces impact of upgrading on traffic congestion.

In a possible implementation thereof, the real-time information is related to the risk of the upgrade task. For example, the boundary of the dangerous area is dynamically expanded or reduced based on the risk of the upgrade task. For example, if an infotainment system needs to be upgraded in an upgrade task, based on the upgrade of the infotainment system, impact on vehicle driving or traffic is comparatively small in an upgrade process, and a safety risk thereof is small. In this case, a defined dangerous area range is comparatively small, or even the dangerous area may not be defined. However, if a to-be-upgraded object in the upgrade task is a battery management system, based on the upgrade of the battery management system, impact on vehicle driving or traffic is comparatively large in an upgrade process, and a safety risk thereof is large. In this case, a defined dangerous area range is expanded. Dangerous areas of different levels and ranges are defined based on upgrade risks, to more flexibly adapt to different upgrade tasks, and avoid an unnecessary space limitation on upgrading.

In this embodiment of this application, the predefined area is set, so that an environment in which the to-be-upgraded vehicle is located can be fully considered, to perform upgrading in a suitable environment. The suitable environment includes but is not limited to a suitable time and/or a suitable place and/or a suitable state of the vehicle. This minimizes a safety risk caused by upgrading.

The following describes, with reference to a location change of a to-be-upgraded vehicle, an over-the-air upgrade method provided in an embodiment of this application.

FIG. 5 is a schematic flowchart of another over-the-air upgrade method according to an embodiment of this application. The over-the-air upgrade method may be performed by the foregoing upgrade server. The method includes the following steps.

Step S501: In response to a first instruction entered by a user, output a warning notification to a to-be-upgraded vehicle when the to-be-upgraded vehicle is located in a dangerous area or within a specific range from the dangerous area.

In this embodiment of this application, cases of responding to the first instruction entered by the user include but are not limited to the following:

In a first case, the user intends to perform upgrading. The user enters the first instruction, and actively queries a version by using the to-be-upgraded vehicle. For example, the to-be-upgraded vehicle sends a version query request to the upgrade server. The version query request includes an ID of the to-be-upgraded vehicle and a current version number of the to-be-upgraded vehicle. The upgrade server queries, in response to the first instruction based on the version query request, whether a version number of an upgrade package is later than the current version number of the to-be-upgraded vehicle. If there is an upgrade package of a later version, the upgrade server obtains location information of the to-be-upgraded vehicle, and provides an upgrade service based on a location relationship between the to-be-upgraded vehicle and a predefined area. For specific content, refer to FIG. 4. Details are not described herein again. When the to-be-upgraded vehicle is located in the dangerous area or within the specific range from the dangerous area, the warning notification is output to the to-be-upgraded vehicle, to notify the user that the vehicle is currently not suitable for upgrading.

In a second case, after receiving an upgrade package sent by a developer, the upgrade server creates an upgrade task. In the upgrade task, the to-be-upgraded vehicle may be specified, where a batch of to-be-upgraded vehicles may be specified, or one to-be-upgraded vehicle may be specified. The upgrade server obtains a version number of the to-be-upgraded vehicle in the upgrade task, and then queries whether a version number of the upgrade package is later than the current version number of the to-be-upgraded vehicle. If there is an upgrade package of a later version, the upgrade server pushes an upgrade message to the to-be-upgraded vehicle. After receiving the message pushed by the upgrade server, a T-box of the to-be-upgraded vehicle presents an upgrade notification to the user by using an application layer. After receiving the upgrade notification, the user enters the first instruction, to instruct the upgrade server to provide an upgrade service for the to-be-upgraded vehicle. After receiving the first instruction, the upgrade server obtains location information of the to-be-upgraded vehicle in response to the first instruction entered by the user, and provides the upgrade service based on a location relationship between the to-be-upgraded vehicle and a predefined area. For specific content, refer to FIG. 4. Details are not described herein again. When the to-be-upgraded vehicle is located in the dangerous area or within the specific range from the dangerous area, the warning notification is output to the to-be-upgraded vehicle, to notify the user that the vehicle is currently not suitable for upgrading.

In this embodiment of this application, after the first instruction entered by the user is received, the first instruction entered by the user is responded to, where a time period after the first instruction entered by the user is received includes, for example, after the upgrade server pushes the upgrade message to the to-be-upgraded vehicle, or before the upgrade server sends an upgrade package download address to the to-be-upgraded vehicle, or after the upgrade server sends an upgrade package download address to the to-be-upgraded vehicle, or before the upgrade server sends the upgrade package to the to-be-upgraded vehicle, or after the upgrade server sends the upgrade package to the to-be-upgraded vehicle. In other words, after the first instruction of the user is received, and after the upgrade server pushes the upgrade message to the to-be-upgraded vehicle, or before the upgrade server sends the upgrade package download address to the to-be-upgraded vehicle, or after the upgrade server sends the upgrade package download address to the to-be-upgraded vehicle, or before the upgrade server sends the upgrade package to the to-be-upgraded vehicle, or after the upgrade server sends the upgrade package to the to-be-upgraded vehicle, the upgrade server may obtain the location information of the to-be-upgraded vehicle in response to the first instruction, and provide the upgrade service based on the location relationship between the to-be-upgraded vehicle and the predefined area.

In this embodiment of this application, when the to-be-upgraded vehicle is located in the dangerous area or within the specific range from the dangerous area, the warning notification is output to the to-be-upgraded vehicle, where the warning notification is used to indicate that the current to-be-upgraded vehicle is not suitable for upgrading. The upgrade server may obtain the location information of the to-be-upgraded vehicle before or when providing the upgrade service for the to-be-upgraded vehicle, to output the warning notification to the to-be-upgraded vehicle and suspend upgrade providing when the to-be-upgraded vehicle is located in the dangerous area or within the specific range from the dangerous area.

Step S502: In response to a second instruction entered by the user, delay providing the upgrade service for the to-be-upgraded vehicle, until the to-be-upgraded vehicle is located in a safe area.

In this embodiment of this application, after the upgrade server outputs the warning notification to the to-be-upgraded vehicle, the to-be-upgraded vehicle outputs the received warning notification to the user, where content presented to the user may include: "the current to-be-upgraded vehicle is not suitable for upgrading", and "cancel the upgrade or delay the upgrade". The user selects "delay the upgrade" based on the warning notification. Then, the to-be-upgraded vehicle sends information about the selection, that is, "delay the upgrade", to the upgrade server. The upgrade server receives the second instruction entered by the user, and in response to the second instruction entered by the user, delays providing the upgrade service for the to-be-upgraded vehicle, until the to-be-upgraded vehicle is located in the safe area.

In this embodiment of this application, when responding to the second instruction entered by the user, the upgrade server suspends providing the upgrade service for the to-be-upgraded vehicle, and obtains the location information of the to-be-upgraded vehicle in real time, to determine whether the to-be-upgraded vehicle is located in the safe area.

In this embodiment of this application, an attribute of an area in which the to-be-upgraded vehicle is located changes from the dangerous area to the safe area. When the to-be-upgraded vehicle is located in the dangerous area or within the specific range from the dangerous area, the warning notification is output to the to-be-upgraded vehicle, and upgrade service providing is suspended. After the to-be-upgraded vehicle moves to the safe area, the upgrade service is provided for the to-be-upgraded vehicle.

FIG. 6 is a schematic flowchart of another over-the-air upgrade method according to an embodiment of this application. The over-the-air upgrade method may be performed by the foregoing upgrade server. The method includes the following steps.

Step S601: In response to a first instruction entered by a user, provide an upgrade service for a to-be-upgraded vehicle when the to-be-upgraded vehicle is located in a safe area.

In this embodiment of this application, cases of responding to the first instruction entered by the user include but are not limited to the following:

In a first case, the user intends to perform upgrading. The user enters the first instruction, and actively queries a version by using the to-be-upgraded vehicle. For example, the to-be-upgraded vehicle sends a version query request to the upgrade server. The version query request includes an ID of the to-be-upgraded vehicle and a current version number of the to-be-upgraded vehicle. The upgrade server queries, in response to the first instruction based on the version query request, whether a version number of an upgrade package is later than the current version number of the to-be-upgraded vehicle. If there is an upgrade package of a later version, the upgrade server obtains location information of the to-be-upgraded vehicle, and provides the upgrade service based on a location relationship between the to-be-upgraded vehicle and a predefined area. For specific content, refer to FIG. 4. Details are not described herein again. When the to-be-upgraded vehicle is located in the safe area, the upgrade service is provided for the to-be-upgraded vehicle.

In a second case, after receiving an upgrade package sent by a developer, the upgrade server creates an upgrade task. In the upgrade task, the to-be-upgraded vehicle may be specified, where a batch of to-be-upgraded vehicles may be specified, or one to-be-upgraded vehicle may be specified. The upgrade server obtains a version number of the to-be-upgraded vehicle in the upgrade task, and then queries whether a version number of the upgrade package is later than the current version number of the to-be-upgraded vehicle. If there is an upgrade package of a later version, the upgrade server pushes an upgrade message to the to-be-upgraded vehicle. After receiving the message pushed by the upgrade server, a T-box of the to-be-upgraded vehicle presents an upgrade notification to the user by using an application layer. After receiving the upgrade notification, the user enters the first instruction, to instruct the upgrade server to provide the upgrade service for the to-be-upgraded vehicle. After receiving the first instruction, the upgrade server obtains location information of the to-be-upgraded vehicle in response to the first instruction entered by the user, and provides the upgrade service based on a location relationship between the to-be-upgraded vehicle and a predefined area. For specific content, refer to FIG. 4. Details are not described herein again. When the to-be-upgraded vehicle is located in the safe area, the upgrade service is provided for the to-be-upgraded vehicle.

In this embodiment of this application, after the first instruction entered by the user is received, the first instruction entered by the user is responded to, where a time period after the first instruction entered by the user is received includes, for example, after the upgrade server pushes the upgrade message to the to-be-upgraded vehicle, or before the upgrade server sends an upgrade package download address to the to-be-upgraded vehicle, or after the upgrade server sends an upgrade package download address to the to-be-upgraded vehicle, or before the upgrade server sends the upgrade package to the to-be-upgraded vehicle, or after the upgrade server sends the upgrade package to the to-be-upgraded vehicle. In other words, after the first instruction of the user is received, and after the upgrade server pushes the upgrade message to the to-be-upgraded vehicle, or before the upgrade server sends the upgrade package download address to the to-be-upgraded vehicle, or after the upgrade server sends the upgrade package download address to the to-be-upgraded vehicle, or before the upgrade server sends the upgrade package to the to-be-upgraded vehicle, or after the upgrade server sends the upgrade package to the to-be-upgraded vehicle, the upgrade server may obtain the location information of the to-be-upgraded vehicle in response to the first instruction, and provide the upgrade service based on the location relationship between the to-be-upgraded vehicle and the predefined area.

In this embodiment of this application, the providing an upgrade service for a to-be-upgraded vehicle when the to-be-upgraded vehicle is located in a safe area includes: pushing the upgrade message to the to-be-upgraded vehicle, or sending the upgrade package download address to the to-be-upgraded vehicle, or sending the upgrade package to the to-be-upgraded vehicle.

Step S602: Output a warning notification to the to-be-upgraded vehicle when it is detected that the to-be-upgraded vehicle enters a dangerous area or a specific range from the dangerous area.

In this embodiment of this application, in a process of providing the upgrade service for the to-be-upgraded vehicle, the upgrade server obtains the location information of the to-be-upgraded vehicle in real time, to output the warning notification to the to-be-upgraded vehicle when it is detected that the to-be-upgraded vehicle enters the dangerous area or the specific range from the dangerous area, where the warning notification is used to indicate that the current to-be-upgraded vehicle is not suitable for upgrading.

Step S602: In response to a second instruction entered by the user, delay providing the upgrade service for the to-be-upgraded vehicle, until the to-be-upgraded vehicle is located in the safe area.

In this embodiment of this application, after the upgrade server outputs the warning notification to the to-be-upgraded vehicle, the to-be-upgraded vehicle outputs the received warning notification to the user, where content presented to the user may include: "the current to-be-upgraded vehicle is not suitable for upgrading", and "cancel the upgrade or delay the upgrade". The user selects "delay the upgrade" based on the warning notification. Then, the to-be-upgraded vehicle sends information about the selection, that is, "delay the upgrade", to the upgrade server. The upgrade server receives the second instruction entered by the user, and in response to the second instruction entered by the user, delays providing the upgrade service for the to-be-upgraded vehicle, until the to-be-upgraded vehicle is located in the safe area.

In this embodiment of this application, an attribute of an area in which the to-be-upgraded vehicle is located changes from the safe area to the dangerous area. After the to-be-upgraded vehicle moves to the safe area, the upgrade server provides the upgrade service for the to-be-upgraded vehicle, and obtains the location information of the to-be-upgraded vehicle in real time, to output the warning notification to the to-be-upgraded vehicle and suspend upgrade service providing when the to-be-upgraded vehicle is located in the dangerous area or within the specific range from the dangerous area.

The following describes, from the perspective of a vehicle-mounted terminal device side, the over-the-air upgrade method provided in embodiments of this application.

Figure 7:
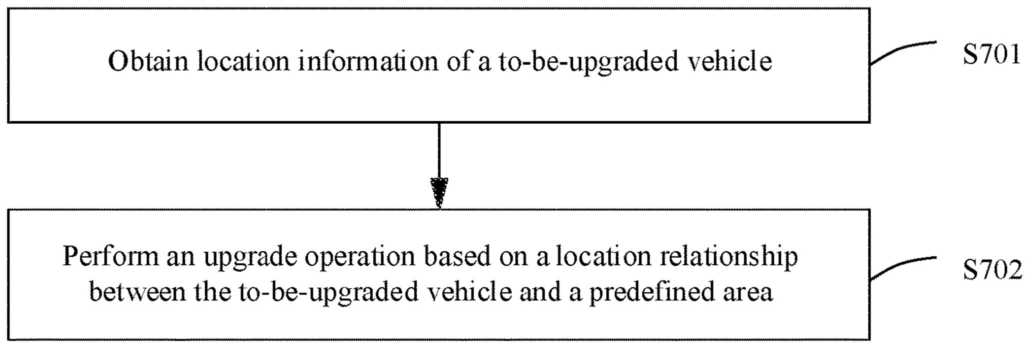
FIG. 7 is a schematic flowchart of another over-the-air upgrade method according to an embodiment of this application.

FIG. 7 is a schematic flowchart of another over-the-air upgrade method according to an embodiment of this application. The over-the-air upgrade method may be performed by the foregoing vehicle-mounted terminal device. The method includes the following steps.

Step S701: Obtain location information of a to-be-upgraded vehicle.

In this embodiment of this application, cases in which the vehicle-mounted terminal device is triggered to obtain the location information of the to-be-upgraded vehicle include but are not limited to the following:

In a first case, the to-be-upgraded vehicle actively queries a version. For example, the to-be-upgraded vehicle sends a version query request to an upgrade server. The version query request includes an ID of the to-be-upgraded vehicle and a current version number of the to-be-upgraded vehicle. The upgrade server queries, based on the version query request, whether a version number of an upgrade package is later than the current version number of the to-be-upgraded vehicle. If there is an upgrade package of a later version, the upgrade server pushes an upgrade message to the to-be-upgraded vehicle. The vehicle-mounted terminal device obtains the location information of the to-be-upgraded vehicle after receiving the upgrade message.

In a second case, after receiving an upgrade package sent by a developer, an upgrade server creates an upgrade task. In the upgrade task, the to-be-upgraded vehicle may be specified, where a batch of to-be-upgraded vehicles may be specified, or one to-be-upgraded vehicle may be specified. The upgrade server obtains a version number of the to-be-upgraded vehicle in the upgrade task, and then queries whether a version number of the upgrade package is later than the current version number of the to-be-upgraded vehicle. If there is an upgrade package of a later version, the upgrade server notifies the vehicle-mounted terminal device. The vehicle-mounted terminal device obtains the location information of the to-be-upgraded vehicle, that is, obtains the location information of the to-be-upgraded vehicle before the vehicle-mounted terminal device receives an upgrade message.

In a third case, after an upgrade server pushes an upgrade message to the to-be-upgraded vehicle, and the vehicle-mounted terminal device receives an upgrade confirmation instruction from a user, the vehicle-mounted terminal device obtains the location information of the to-be-upgraded vehicle.

In a fourth case, before an upgrade server sends an upgrade package download address to the to-be-upgraded vehicle, the vehicle-mounted terminal device obtains the location information of the to-be-upgraded vehicle.

In a fifth case, after an upgrade server sends an upgrade package download address to the to-be-upgraded vehicle, the vehicle-mounted terminal device obtains the location information of the to-be-upgraded vehicle.

In a sixth case, before an upgrade server sends an upgrade package to the to-be-upgraded vehicle, the vehicle-mounted terminal device obtains the location information of the to-be-upgraded vehicle.

In a seventh case, after an upgrade server sends an upgrade package to the to-be-upgraded vehicle, the vehicle-mounted terminal device obtains the location information of the to-be-upgraded vehicle.

It can be understood that the over-the-air upgrade method in this embodiment of this application may be applicable to a case before the to-be-upgraded vehicle performs an upgrade operation. Before the to-be-upgraded vehicle performs the upgrade operation, the vehicle-mounted terminal device obtains the location information of the to-be-upgraded vehicle, to perform the over-the-air upgrade method in this embodiment of this application.

In this embodiment of this application, the vehicle-mounted terminal device may obtain the location information of the to-be-upgraded vehicle from a positioning system. The location information may be understood as geographic location information, and the location information includes geographic location coordinates, such as latitude and longitude values. The location information may further include geographic information. The geographic information may include that current geographic location coordinates correspond to a road, a residential district, or the like, and may further include road condition information corresponding to the geographic location coordinates, for example, the current road is congested, requires slow moving, has a traffic accident, or is being repaired.

Step S702: Perform the upgrade operation based on a location relationship between the to-be-upgraded vehicle and a predefined area.

In this embodiment of this application, after the location information of the to-be-upgraded vehicle is obtained, whether to perform the upgrade operation may be determined. Specifically, whether to perform the upgrade operation is determined based on the location relationship between the to-be-upgraded vehicle and the predefined area. The predefined area includes one or more of a dangerous area and a safe area. The dangerous area is used to indicate an area in which upgrading is not allowed, and the safe area is used to indicate an area in which upgrading is allowed.

In this embodiment of this application, the determining, based on the location relationship between the to-be-upgraded vehicle and the predefined area, whether to perform the upgrade operation may specifically include: determining an area attribute of a location of the to-be-upgraded vehicle based on the location of the to-be-upgraded vehicle, and then determining, based on the area attribute of the location of the to-be-upgraded vehicle, whether to perform the upgrade operation. The area attribute includes the safe area or the dangerous area.

In this embodiment of this application, the determining an area attribute of a location of the to-be-upgraded vehicle based on the location of the to-be-upgraded vehicle may specifically include: determining the area attribute of the location of the to-be-upgraded vehicle based on geographic information of the location of the to-be-upgraded vehicle, where the geographic information is a geographic meaning contained and expressed by geographic data. Geographic information belongs to spatial information. Location recognition of geographic information is associated with data, and a location thereof is identified by using the data. Geographic information is derived from geographic data. Geographic information is a meaning contained in geographic data, is information about a specific location on the Earth's surface, and is representation of and all useful knowledge about a property, a feature, and a motion status of a geographic entity. Geographic data mainly includes three parts: spatial location data, attribute feature data, and time-domain feature data. The spatial location data describes a location of a geographic object. The location includes both an absolute location of a geographic element (such as terrestrial latitude and longitude coordinates) and a relative location relationship between geographic elements (such as adjacency or inclusion in space). The attribute feature data is a qualitative or quantitative indicator describing a specific geographic element feature, such as a class, a width, a start point, an end point, and a traffic status of a road. The time-domain feature data records a moment at which or a time period in which the geographic data is collected or a geographic phenomenon occurs. Geographic information may include a geographic location (for example, latitude and longitude) and an attribute feature (for example, a road and a road condition) of a local area.

In this embodiment of this application, the determining an area attribute of a location of the to-be-upgraded vehicle based on the location of the to-be-upgraded vehicle, that is, the determining the area attribute of the location of the to-be-upgraded vehicle based on geographic information of the location of the to-be-upgraded vehicle may specifically include one or more of the following manners: when the location of the to-be-upgraded vehicle is a lane area, determining that the area attribute of the location of the to-be-upgraded vehicle is the dangerous area; when the location of the to-be-upgraded vehicle is a congested area, determining that the area attribute of the location of the to-be-upgraded vehicle is the dangerous area; or when the location of the to-be-upgraded vehicle is a slow-moving area, determining that the area attribute of the location of the to-be-upgraded vehicle is the dangerous area.

In this embodiment of this application, a definition of the area attribute is related to the geographic information. In other words, definitions of the dangerous area and the safe area are related to the geographic information. For example, a highway, an urban expressway, an urban arterial road, a motor lane, and the like may be defined as dangerous areas. Upgrading in the dangerous area may bring a comparatively high risk to traffic safety and driving of the vehicle. An area other than the dangerous area may be defined as the safe area.

For example, the vehicle-mounted terminal device or the upgrade server may determine a relationship between the geographic information and the safe area and/or dangerous area based on Table 1 above, and then define a specific geographic area based on the obtained geographic information.

In this embodiment of this application, the area attribute may define only the safe area, or may define only the dangerous area, or define both the safe area and the dangerous area, or define a third area between the dangerous area and the safe area. This is not specifically limited in this application.

In this embodiment of this application, the determining the area attribute of the location of the to-be-upgraded vehicle based on geographic information of the location of the to-be-upgraded vehicle includes: directly obtaining the geographic information of the location of the to-be-upgraded vehicle from the location information of the to-be-upgraded vehicle, and then determining the area attribute of the location of the to-be-upgraded vehicle based on the geographic information.

For example, when the location information of the to-be-upgraded vehicle includes location coordinates of the to-be-upgraded vehicle and geographic information corresponding to the location coordinates, for example, the location coordinates of the to-be-upgraded vehicle are (X, Y), where X may represent a longitude value, Y may represent a latitude value, and the geographic information corresponding to the location coordinates (X, Y) is that the location coordinates (X, Y) correspond to an XX road, it may be determined that the area attribute of the location of the to-be-upgraded vehicle is the dangerous area.

In this embodiment of this application, the determining the area attribute of the location of the to-be-upgraded vehicle based on geographic information of the location of the to-be-upgraded vehicle includes: determining the area attribute of the location of the to-be-upgraded vehicle based on geographic information of an area in which the to-be-upgraded vehicle is located and location coordinates of the to-be-upgraded vehicle.

For example, when the location information of the to-be-upgraded vehicle includes only the location coordinates of the to-be-upgraded vehicle, the geographic information of the area in which the to-be-upgraded vehicle is located is obtained, and the area attribute of the location of the to-be-upgraded vehicle is obtained based on the location coordinates of the to-be-upgraded vehicle and the geographic information of the area. For example, the location coordinates of the to-be-upgraded vehicle are (X, Y). In this case, geographic information of an area corresponding to the location coordinates (X, Y), such as geographic information of a city corresponding to the location coordinates (X, Y) or geographic information of a province corresponding to the location coordinates (X, Y), is obtained. The geographic information corresponding to the location coordinates (X, Y) is determined based on the geographic information of the city corresponding to the location coordinates (X, Y). Specifically, the location coordinates (X, Y) of the to-be-upgraded vehicle are obtained, and a map of the area in which the to-be-upgraded vehicle is located, such as a municipal map, a provincial map, a national map, or a global map, is obtained. The geographic information is extracted from the map. The geographic information may include a geographic location, road condition information based on the geographic location, and the like. The road condition information may include, for example, a class, a width, a start point, and an end point of a road section, and may further include a traffic status or the like of the road section. Attribute data of a road section may be further obtained with reference to a time segment. For example, for a road section in front of a school gate, a traffic status of the road section is comparatively crowded when students go to school or return home, and a traffic status of the road section is good when it is not time for students to go to school or return home. Then, the location coordinates (X, Y) of the to-be-upgraded vehicle are compared with the municipal map, and the geographic information corresponding to the location coordinates (X, Y) of the to-be-upgraded vehicle is determined, so that whether the location coordinates (X, Y) of the to-be-upgraded vehicle correspond to a road can be determined, and road condition information or the like can be obtained if the location coordinates (X, Y) correspond to the road.

In this embodiment of this application, the determining the area attribute of the location of the to-be-upgraded vehicle based on geographic information of the location of the to-be-upgraded vehicle includes: determining the area attribute of the location of the to-be-upgraded vehicle based on an area attribute classification of an area in which the to-be-upgraded vehicle is located and location coordinates of the to-be-upgraded vehicle.

For example, the area attribute classification of the area in which the to-be-upgraded vehicle is located may be implemented by using a geo-fencing technology. For example, the upgrade server or the vehicle-mounted terminal device obtains an electronic map of the area in which the to-be-upgraded vehicle is located, and obtains areas through division on the electronic map, for example, obtains a virtual geographic boundary through enclosure by using a virtual fence. The upgrade server or the vehicle-mounted terminal device obtains a virtual geographic boundary by enclosing a lane area on the electronic map by using a virtual fence, and defines the lane area as the dangerous area. Alternatively, the upgrade server or the vehicle-mounted terminal device obtains a virtual geographic boundary by enclosing a residential district on the electronic map by using a virtual fence, and defines the residential district as the safe area. The rest may be deduced by analogy. In this way, each safe area and/or dangerous area are/is defined on the electronic map of the area in which the to-be-upgraded vehicle is located. Then, the area attribute of the location of the to-be-upgraded vehicle may be obtained based on which area the to-be-upgraded vehicle is located in, for example, the to-be-upgraded vehicle is located in an area defined as the dangerous area on the electronic map.

In this embodiment of this application, a "virtual fence" is defined in geographic space, and corresponds to a geographic area. When the vehicle-mounted terminal device enters or leaves the area, the vehicle-mounted terminal device or the upgrade server may receive a notification, or a related mobile Internet service is triggered, for example, upgrading is allowed in the safe area, and upgrading is not allowed in the dangerous area.

In this embodiment of this application, if the upgrade server defines the predefined area, the upgrade server sends area information of the predefined area to the vehicle-mounted terminal device, and the vehicle-mounted terminal device obtains area attribute classification information of the area in which the to-be-upgraded vehicle is located, and then determines the area attribute of the location of the to-be-upgraded vehicle based on the location information of the to-be-upgraded vehicle.

In this embodiment of this application, the vehicle-mounted terminal device calculates a location relationship between the location of the to-be-upgraded vehicle and the safe area. If the location of the to-be-upgraded vehicle is within a boundary of the safe area, the to-be-upgraded vehicle is located in the safe area. The vehicle-mounted terminal device calculates a location relationship between the location of the to-be-upgraded vehicle and the dangerous area. If the location of the to-be-upgraded vehicle is within a boundary of the dangerous area, the to-be-upgraded vehicle is located in the dangerous area. If the location of the to-be-upgraded vehicle is not within a boundary of the dangerous area, but a shortest distance between the location of the to-be-upgraded vehicle and the dangerous area for upgrading is less than a preset threshold, the to-be-upgraded vehicle is to be located in the dangerous area. If the location of the to-be-upgraded vehicle is not within a boundary of the dangerous area, but a driving direction of the to-be-upgraded vehicle is toward the dangerous area, the to-be-upgraded vehicle is to be located in the dangerous area. In all of the foregoing cases, the area attribute of the location of the to-be-upgraded vehicle may be determined as the dangerous area.

In this embodiment of this application, when it is determined that the area attribute of the location of the to-be-upgraded vehicle is the safe area, that is, when the to-be-upgraded vehicle is located in the safe area, the upgrade operation is performed. The performing the upgrade operation includes but is not limited to the following cases: If upgrade operation execution has not started, the upgrade operation is performed when the to-be-upgraded vehicle is located in the safe area; or if the upgrade operation has been performed, but the upgrade operation is interrupted, the upgrade operation continues to be performed when the to-be-upgraded vehicle is located in the safe area.

In this embodiment of this application, when it is determined that the area attribute of the location of the to-be-upgraded vehicle is the dangerous area, that is, when the to-be-upgraded vehicle is located in the dangerous area or within a specific range from the dangerous area, upgrade operation execution is suspended. Suspending performing the upgrade operation includes but is not limited to the following: If upgrade operation execution has not started, the upgrade operation is not performed when the to-be-upgraded vehicle is located in the dangerous area or within the specific range from the dangerous area, that is, upgrade operation execution is not started for the to-be-upgraded vehicle at all. Alternatively, if the upgrade operation has been performed, or the upgrade operation is being performed currently, upgrade operation execution is interrupted when the to-be-upgraded vehicle is located in the dangerous area or within the specific range from the dangerous area.

In this embodiment of this application, the upgrade operation includes one or more of the following services: requesting upgrade permission from the user, or downloading the upgrade package, or performing upgrading based on the upgrade package.

For example, the performing the upgrade operation includes the following cases: If upgrade operation execution has not started, the upgrade message is pushed to the to-be-upgraded vehicle when the to-be-upgraded vehicle is located in the safe area. If the upgrade operation has been performed, for example, the upgrade permission has been requested from the user, but a request process is interrupted, when the to-be-upgraded vehicle is located in the safe area, the upgrade permission may continue to be requested from the user, or the upgrade package may continue to be downloaded, or upgrading may continue to be performed based on the upgrade package.

For example, suspending performing the upgrade operation includes the following cases: If upgrade operation execution has not started, the upgrade permission is not requested from the user when the to-be-upgraded vehicle is located in the dangerous area or within the specific range from the dangerous area. If the upgrade operation has been performed, for example, the upgrade permission has been requested from the user, when the to-be-upgraded vehicle is located in the dangerous area or within the specific range from the dangerous area, requesting the upgrade permission from the user is suspended, or upgrade package downloading is suspended, or upgrading based on the upgrade package is suspended.

In this embodiment of this application, when the to-be-upgraded vehicle is located in the dangerous area or within the specific range from the dangerous area, upgrade operation execution is delayed until the to-be-upgraded vehicle is located in the safe area. To be specific, in a process in which the upgrade server provides an upgrade service for the to-be-upgraded vehicle or in a process in which the vehicle-mounted terminal device performs the upgrade operation, the vehicle-mounted terminal device also obtains the location information of the to-be-upgraded vehicle in real time, determines the area attribute of the current location of the to-be-upgraded vehicle, and when the to-be-upgraded vehicle is located in the dangerous area or within the specific range from the dangerous area, delays performing the upgrade operation, until the to-be-upgraded vehicle is located in the safe area. Further, when the vehicle-mounted terminal device delays performing the upgrade operation, a warning notification may appear, to notify the user that the vehicle is currently not suitable for upgrading.

In this embodiment of this application, after the safe area and/or the dangerous area are/is defined, information about each area, including boundary information, may be obtained. For example, a virtual geographic boundary may be obtained by enclosing each area by using a geo-fencing technology. The safe area is determined by the boundary of the safe area, and the dangerous area is determined by the boundary of the dangerous area. It can be understood that determining the boundary of the safe area is determining the safe area, and determining the boundary of the dangerous area is determining the dangerous area.

In this embodiment of this application, the upgrade server or the vehicle-mounted terminal device may obtain boundary information, including a geographic location (longitude and latitude), a shape, and the like, of each area. For example, if the safe area is round, latitude and longitude of a center of the safe area and a radius of the safe area may be obtained. The boundary of the safe area may be determined based on a location of the center and the radius, to obtain an area and a range of the safe area. If the safe area is a polygon, a shape, an area, and a range of the polygon may be determined based on locations of connection points between sides of the polygon. Shapes of the safe area and/or the dangerous area include but are not limited to a polygon and a circle.

In this embodiment of this application, a boundary of one or more of the dangerous area and the safe area is adjustable, and the boundary of the safe area and/or the boundary of the dangerous area may be changed. The boundary of the safe area and the boundary of the dangerous area are dynamically changed to adapt to different situations.

In a possible implementation thereof, that a boundary of one or more of the dangerous area and the safe area is adjustable specifically includes: the boundary of the dangerous area or the boundary of the safe area is adjusted based on real-time information received in real time, where the real-time information includes one or more of information that affects a definition of the boundary of the dangerous area and information that affects a definition of the boundary of the safe area, and the real-time information further includes one or more of the following pieces of information: a risk of the upgrade task, current road condition information, and positioning precision of the to-be-upgraded vehicle. In this way, the boundary of the safe area, or the boundary of the dangerous area, or the boundary of the safe area and the boundary of the dangerous area can be dynamically changed based on the received real-time information.

In a possible implementation thereof, the real-time information is related to precision of the electronic map and/or the positioning precision of the to-be-upgraded vehicle. For example, dangerous areas and safe areas of different precision are defined based on the precision of the electronic map and/or the positioning precision of the to-be-upgraded vehicle, that is, dangerous areas and safe areas of different ranges are defined based on the precision of the electronic map and/or the positioning precision of the to-be-upgraded vehicle. When the precision of the electronic map is insufficient or the positioning precision of the to-be-upgraded vehicle is insufficient, precision of defining the dangerous area is also reduced, and the boundary of the dangerous area is expanded. For example, the dangerous area may be defined as an entire highway, urban expressway, or arterial road range. When the precision of the electronic map is comparatively high and/or the positioning precision of the to-be-upgraded vehicle is comparatively high, precision of defining the dangerous area is also reduced, and the boundary of the dangerous area is reduced. For example, a motor lane in an entire urban road is defined as the dangerous area, and a non-motor lane is the safe area.

In this embodiment of this application, when the precision of the electronic map and/or the positioning precision of the to-be-upgraded vehicle are/is high, a more precise boundary of the dangerous area can be defined, so that a limitation on upgrade space can be reduced. If the precision of the electronic map and/or the positioning precision of the to-be-upgraded vehicle are/is comparatively low, a defined dangerous area range is comparatively large, so that upgrade safety can be ensured. Defining dangerous areas of different precision can adapt to different precision of electronic maps and different positioning precision of to-be-upgraded vehicles, thereby improving adaptability.

In a possible implementation thereof, the real-time information is dynamically related to the road condition information of the area in which the to-be-upgraded vehicle is located. For example, the boundary of the dangerous area is dynamically expanded or reduced based on the road condition information. For example, an area with severe traffic congestion is defined as the dangerous area, and a boundary of such a dangerous area is expanded. An area with some traffic congestion is defined as the dangerous area, and when traffic congestion is relieved, the area is defined as the safe area. For example, in time segments not for students to go to school or return home, a road area at a school gate is defined as the safe area; and in time segments for students to go to school and return home, the road area at the school gate is defined as the dangerous area. This avoids traffic congestion aggravation caused by a problem in an upgrade process, and reduces impact of upgrading on traffic congestion.

In a possible implementation thereof, the real-time information is related to the risk of the upgrade task. For example, the boundary of the dangerous area is dynamically expanded or reduced based on the risk of the upgrade task. For example, if an infotainment system needs to be upgraded in an upgrade task, based on the upgrade of the infotainment system, impact on vehicle driving or traffic is comparatively small in an upgrade process, and a safety risk thereof is small. In this case, a defined dangerous area range is comparatively small, or even the dangerous area may not be defined. However, if a to-be-upgraded object in the upgrade task is a battery management system, based on the upgrade of the battery management system, impact on vehicle driving or traffic is comparatively large in an upgrade process, and a safety risk thereof is large. In this case, a defined dangerous area range is expanded. Dangerous areas of different levels and ranges are defined based on upgrade risks, to more flexibly adapt to different upgrade tasks, and avoid an unnecessary space limitation on upgrading.

Figure 8:
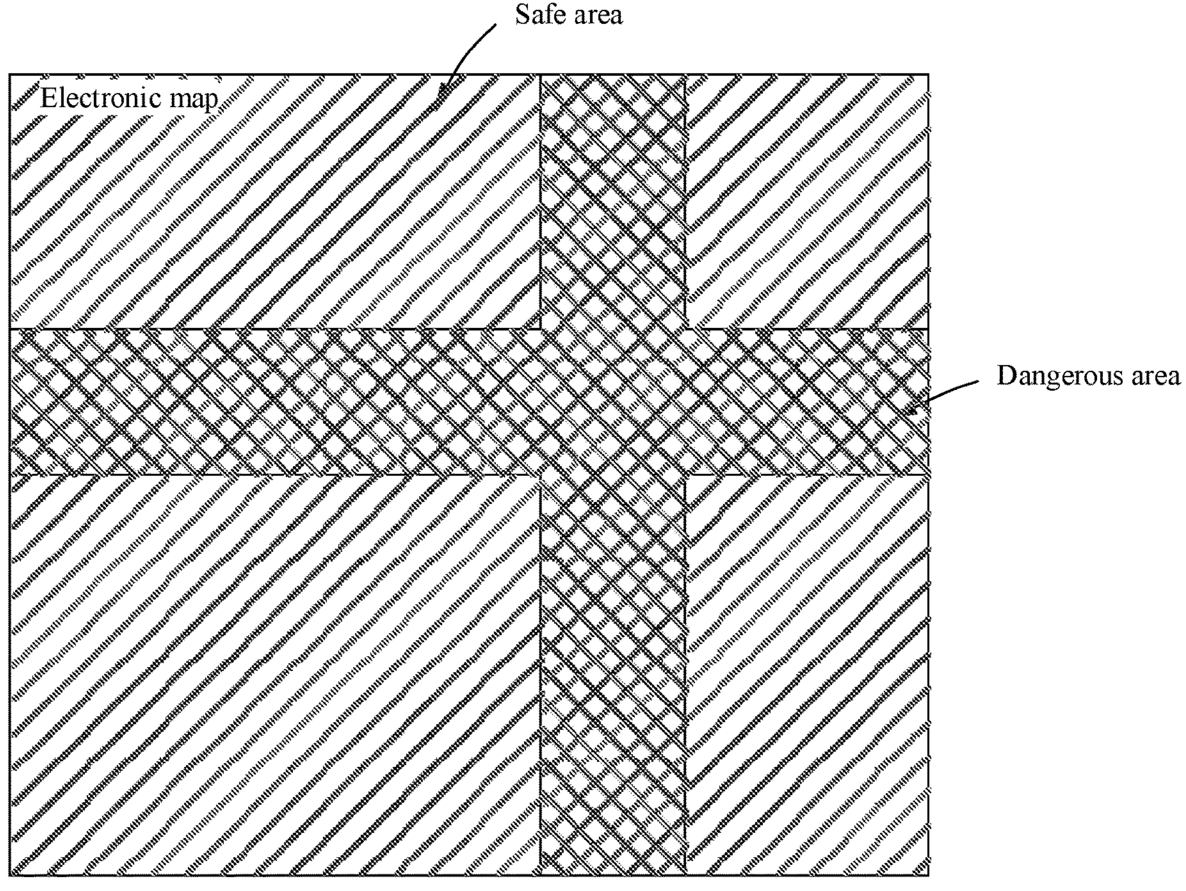
FIG. 8 is an example diagram of an electronic map according to an embodiment of this application.

In this embodiment of this application, with reference to FIG. 8, the vehicle-mounted terminal device may further display the safe area on the electronic map in a first display manner, and display the dangerous area on the electronic map in a second display manner different from the first display manner. The display manner may be using a color, an area filling pattern, an identifier, or the like. For example, the first display manner is using a green color, that is, the safe area is displayed in green, and the second display manner is using a red color, that is, the dangerous area is displayed in red. Further, the third area may be displayed in a third display manner different from the first display manner and different from the second display manner. This is not specifically limited in this application. Different areas are displayed on the electronic map, so that the user can move to a corresponding location for upgrading based on a requirement of the user.

In this embodiment of this application, the predefined area is set, so that an environment in which the to-be-upgraded vehicle is located can be fully considered, to perform upgrading in a suitable environment. The suitable environment includes but is not limited to a suitable time and/or a suitable place and/or a suitable state of the vehicle. This minimizes a safety risk caused by upgrading. In addition, a vehicle end performs the over-the-air upgrade method to implement safety control. Compared with execution by the upgrade server, in this manner, the upgrade server does not need to obtain the real-time location information of the vehicle, thereby helping protect user privacy.

The following describes, with reference to a location change of a to-be-upgraded vehicle, an over-the-air upgrade method provided in an embodiment of this application.

Figure 9:
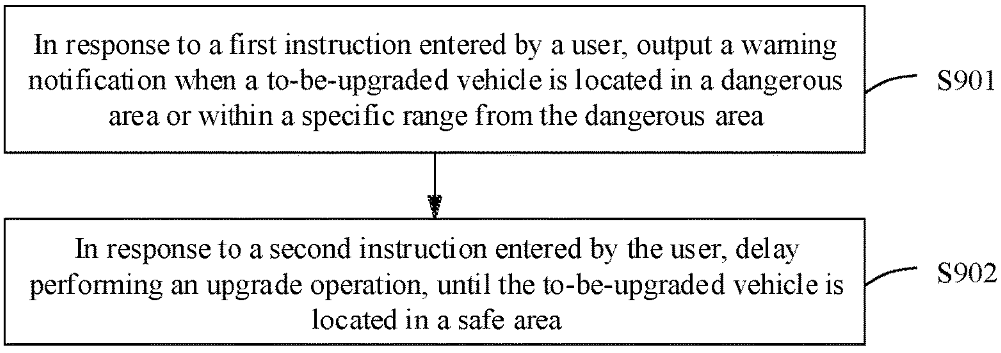
FIG. 9 is a schematic flowchart of another over-the-air upgrade method according to an embodiment of this application.

FIG. 9 is a schematic flowchart of another over-the-air upgrade method according to an embodiment of this application. The over-the-air upgrade method may be performed by the foregoing vehicle-mounted terminal device. The method includes the following steps.

Step S901: In response to a first instruction entered by a user, output a warning notification when a to-be-upgraded vehicle is located in a dangerous area or within a specific range from the dangerous area.

In this embodiment of this application, cases of responding to the first instruction entered by the user include but are not limited to the following:

In a first case, the user intends to perform upgrading. The user enters the first instruction to the vehicle-mounted terminal device, where the first instruction is used to instruct to perform an upgrade operation, and actively query a version by using the to-be-upgraded vehicle. After receiving the first instruction entered by the user, the vehicle-mounted terminal device obtains location information of the to-be-upgraded vehicle, and performs the upgrade operation based on a location relationship between the to-be-upgraded vehicle and a predefined area. For specific content, refer to FIG. 7. Details are not described herein again. When the to-be-upgraded vehicle is located in the dangerous area or within the specific range from the dangerous area, the warning notification is output to notify the user that the vehicle is currently not suitable for upgrading.

In a second case, after receiving an upgrade package sent by a developer, an upgrade server creates an upgrade task. In the upgrade task, the to-be-upgraded vehicle may be specified, where a batch of to-be-upgraded vehicles may be specified, or one to-be-upgraded vehicle may be specified. The upgrade server obtains a version number of the to-be-upgraded vehicle in the upgrade task, and then queries whether a version number of the upgrade package is later than the current version number of the to-be-upgraded vehicle. If there is an upgrade package of a later version, the upgrade server pushes an upgrade message to the to-be-upgraded vehicle. After receiving the message pushed by the upgrade server, a T-box of the to-be-upgraded vehicle presents an upgrade notification to the user by using an application layer. After receiving the upgrade notification, the user enters the first instruction to instruct to perform the upgrade operation. For specific content, refer to FIG. 4. Details are not described herein again. When the to-be-upgraded vehicle is located in the dangerous area or within the specific range from the dangerous area, the warning notification is output to notify the user that the vehicle is currently not suitable for upgrading.

In this embodiment of this application, after the first instruction of the user is received, and after the upgrade server pushes the upgrade message to the to-be-upgraded vehicle, or before the upgrade server sends an upgrade package download address to the to-be-upgraded vehicle, or after the upgrade server sends an upgrade package download address to the to-be-upgraded vehicle, or before the upgrade server sends the upgrade package to the to-be-upgraded vehicle, or after the upgrade server sends the upgrade package to the to-be-upgraded vehicle, the vehicle-mounted terminal device may obtain the location information of the to-be-upgraded vehicle in response to the first instruction, and perform the upgrade operation based on the location relationship between the to-be-upgraded vehicle and the predefined area.

In this embodiment of this application, when the to-be-upgraded vehicle is located in the dangerous area or within the specific range from the dangerous area, the vehicle-mounted terminal device outputs the warning notification, where the warning notification is used to indicate that the current to-be-upgraded vehicle is not suitable for upgrading. The vehicle-mounted terminal device may obtain the location information of the to-be-upgraded vehicle before or when performing the upgrade operation, to output the warning notification and suspend upgrade operation execution when the to-be-upgraded vehicle is located in the dangerous area or within the specific range from the dangerous area.

Figure 10:
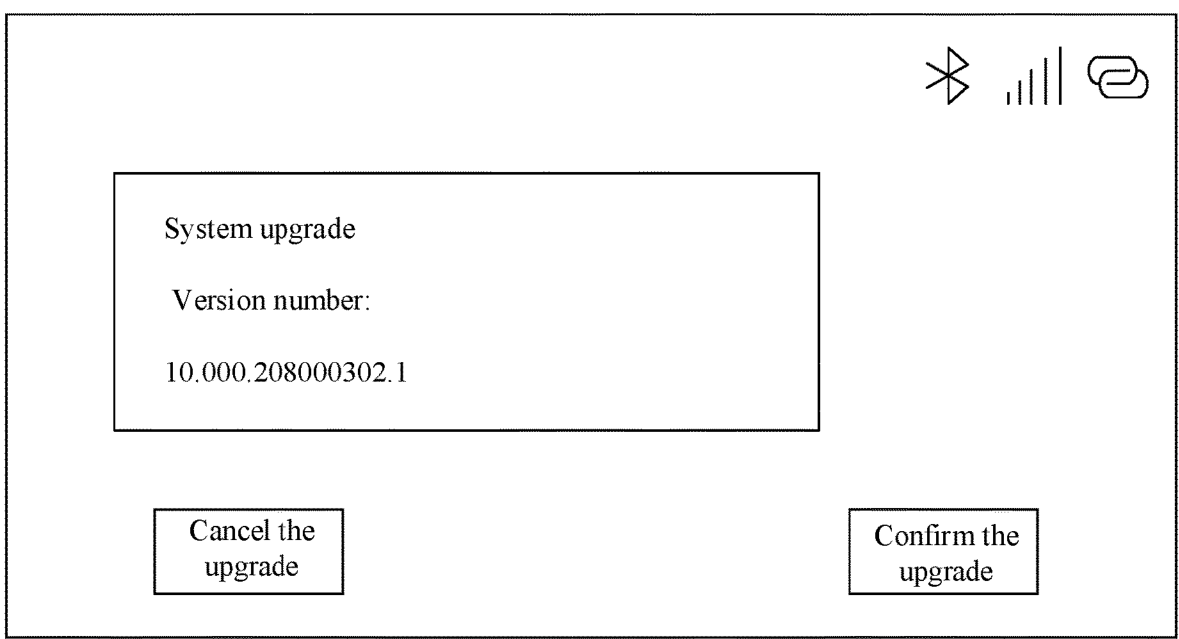
FIG. 10 is a schematic diagram of an upgrade notification interface according to an embodiment of this application.

For example, with reference to FIG. 10, a "system upgrade" notification is presented by using the application layer, and the user may tap a "cancel the upgrade" button or a "confirm the upgrade" button based on a requirement. When the user taps the "confirm the upgrade" button, the user enters the first instruction. The vehicle-mounted terminal device obtains the location information of the to-be-upgraded vehicle in response to the first instruction, and determines whether to perform the upgrade operation.

Step S902: In response to a second instruction entered by the user, delay performing the upgrade operation, until the to-be-upgraded vehicle is located in a safe area.

Figure 11:
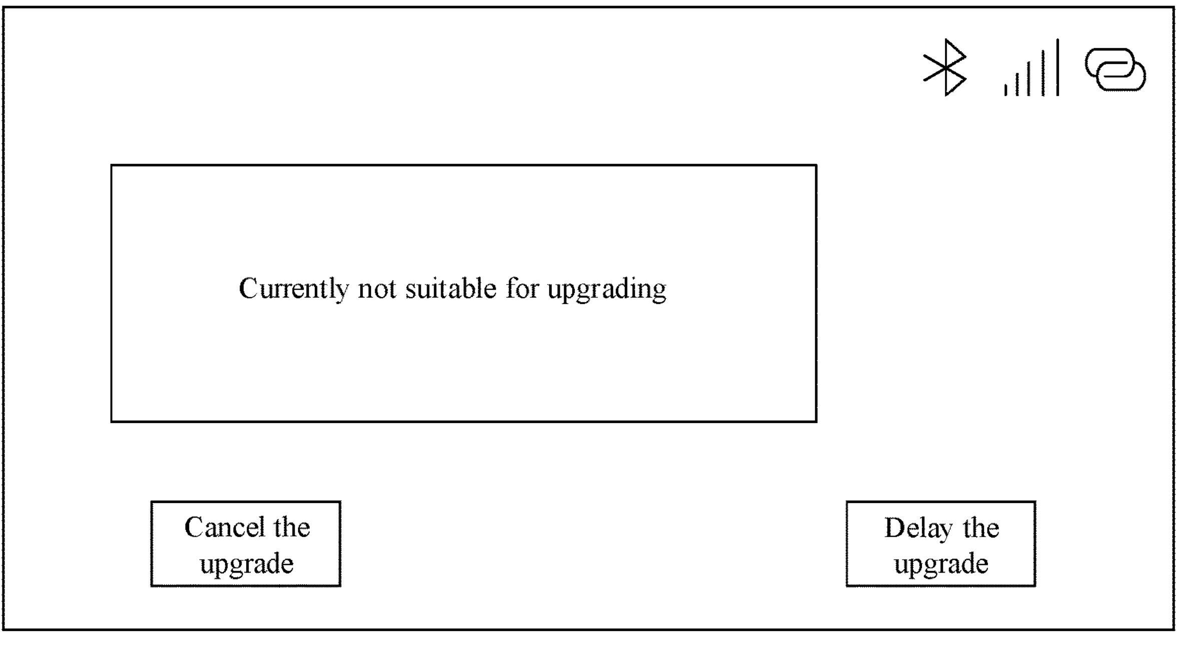
FIG. 11 is a schematic diagram of a warning notification interface according to an embodiment of this application.

In this embodiment of this application, when the to-be-upgraded vehicle is located in the dangerous area or within the specific range from the dangerous area, the warning notification is output, where the warning notification is used to indicate that the current to-be-upgraded vehicle is not suitable for upgrading. With reference to FIG. 11, related warning notification content may be presented by using the application layer, where the content includes a notification indicating that the vehicle is currently not suitable for upgrading, and the user may tap a "cancel the upgrade"

button or a "delay the upgrade" button based on a requirement. When the user taps the "delay the upgrade" button, the user enters the second instruction. The vehicle-mounted terminal device receives information about the second instruction, that is, receives information indicating that the user instructs to delay performing the upgrade operation. In response to the second instruction, the vehicle-mounted terminal device delays performing the upgrade operation, until the to-be-upgraded vehicle is located in the safe area, that is, delays performing the upgrade operation, and obtains the location information of the to-be-upgraded vehicle in real time, so that when detecting that the to-be-upgraded vehicle is located in the safe area, the vehicle-mounted terminal device can perform the upgrade operation, for example, display the upgrade notification, continue to download the upgrade package, or continue to perform upgrading based on the upgrade package.

Figure 12:
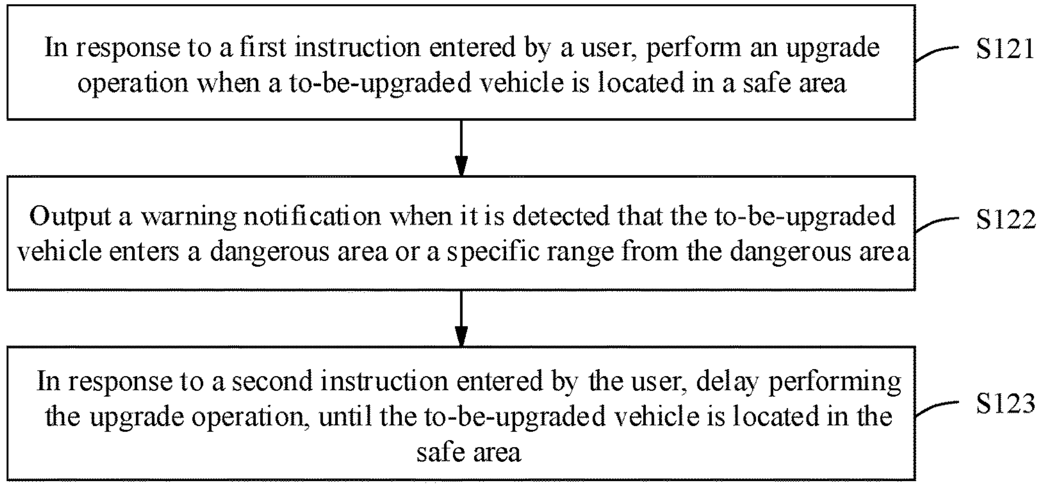
FIG. 12 is a schematic flowchart of another over-the-air upgrade method according to an embodiment of this application.

FIG. 12 is a schematic flowchart of another over-the-air upgrade method according to an embodiment of this application. The over-the-air upgrade method may be performed by the foregoing vehicle-mounted terminal device. The method includes the following steps.

Step S121: In response to a first instruction entered by a user, perform an upgrade operation when a to-be-upgraded vehicle is located in a safe area.

Step S122: Output a warning notification when it is detected that the to-be-upgraded vehicle enters a dangerous area or a specific range from the dangerous area.

Step S123: In response to a second instruction entered by the user, delay performing the upgrade operation, until the to-be-upgraded vehicle is located in the safe area.

In this embodiment of this application, a difference between FIG. 12 and FIG. 9 lies in that an area in which the to-be-upgraded vehicle is located changes from the safe area to the dangerous area. In response to the first instruction used to instruct to perform the upgrade operation, it is determined that the to-be-upgraded vehicle is located in the safe area, and the upgrade operation is performed. In a process in which the upgrade operation is performed, location information of the to-be-upgraded vehicle is obtained in real time, and the warning notification is output when it is detected that the to-be-upgraded vehicle is located in the dangerous area or within the specific range from the dangerous area. The user enters the second instruction used to instruct to delay execution. In response to the second instruction entered by the user, upgrade operation execution is delayed until the to-be-upgraded vehicle is located in the safe area. Upgrade operation execution is delayed, and the location information of the to-be-upgraded vehicle is obtained in real time. When it is detected that the area in which the to-be-upgraded vehicle is located changes to the safe area, the upgrade operation continues to be performed.

Figure 13:
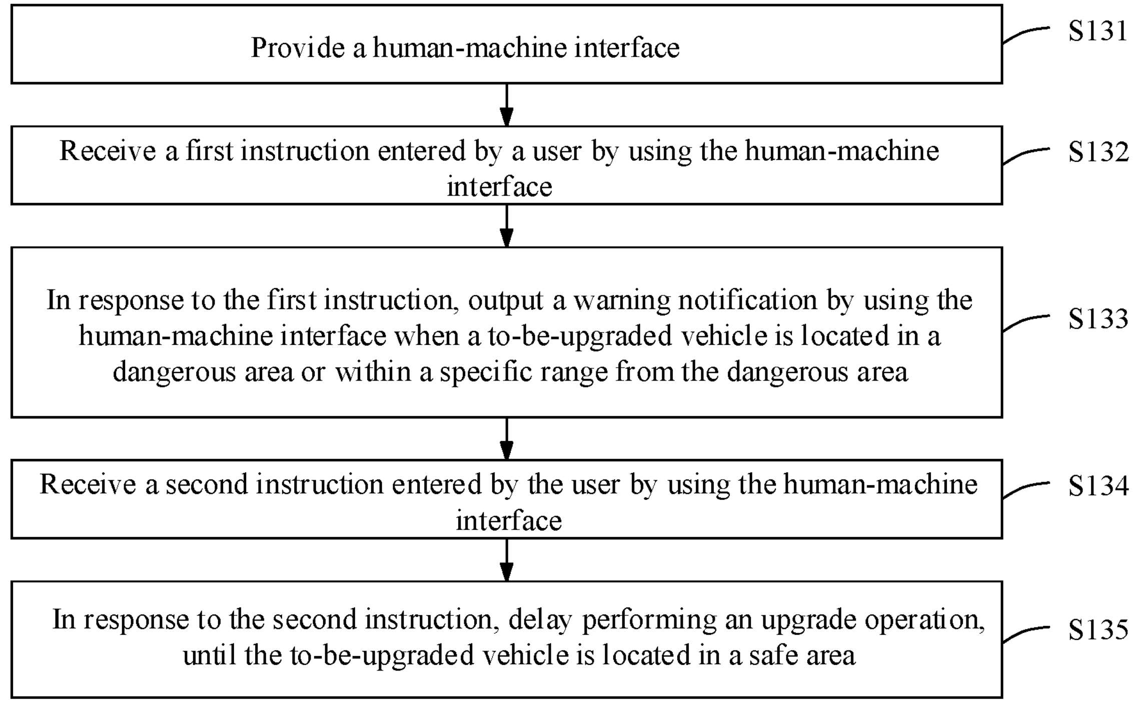
FIG. 13 is a schematic flowchart of another over-the-air upgrade method according to an embodiment of this application.

FIG. 13 is a schematic flowchart of another over-the-air upgrade method according to an embodiment of this application. The over-the-air upgrade method may be performed by the foregoing vehicle-mounted terminal device. The method includes the following steps.

Step S131: Provide a human-machine interface.

In this embodiment of this application, the human-machine interface may present corresponding upgrade notification information. For example, when an upgrade server pushes an upgrade message, an upgrade notification may be presented based on the upgrade message. Alternatively, after an area in which a to-be-upgraded vehicle is located changes from a dangerous area to a safe area, an upgrade notification indicating that the to-be-upgraded vehicle is suitable for upgrading may be presented. Alternatively, a warning notification may be presented to notify a user that the vehicle is currently not suitable for upgrading. For presentation of the human-machine interface, refer to FIG. 10 and FIG. 11. This is not specifically limited in this application.

Step S132: Receive a first instruction entered by the user by using the human-machine interface.

Step S133: In response to the first instruction, output the warning notification by using the human-machine interface when the to-be-upgraded vehicle is located in the dangerous area or within a specific range from the dangerous area.

Step S134: Receive a second instruction entered by the user by using the human-machine interface.

Step S135: In response to the second instruction, delay performing an upgrade operation, until the to-be-upgraded vehicle is located in the safe area.

In this embodiment of this application, a difference between FIG. 13 and FIG. 9 lies in that the human-machine interface is provided, the instruction entered by the user is received by using the human-machine interface, and corresponding information is presented to the user by using the human-machine interface, where the corresponding information includes but is not limited to the upgrade notification, the warning notification, and the like.

Figure 14:
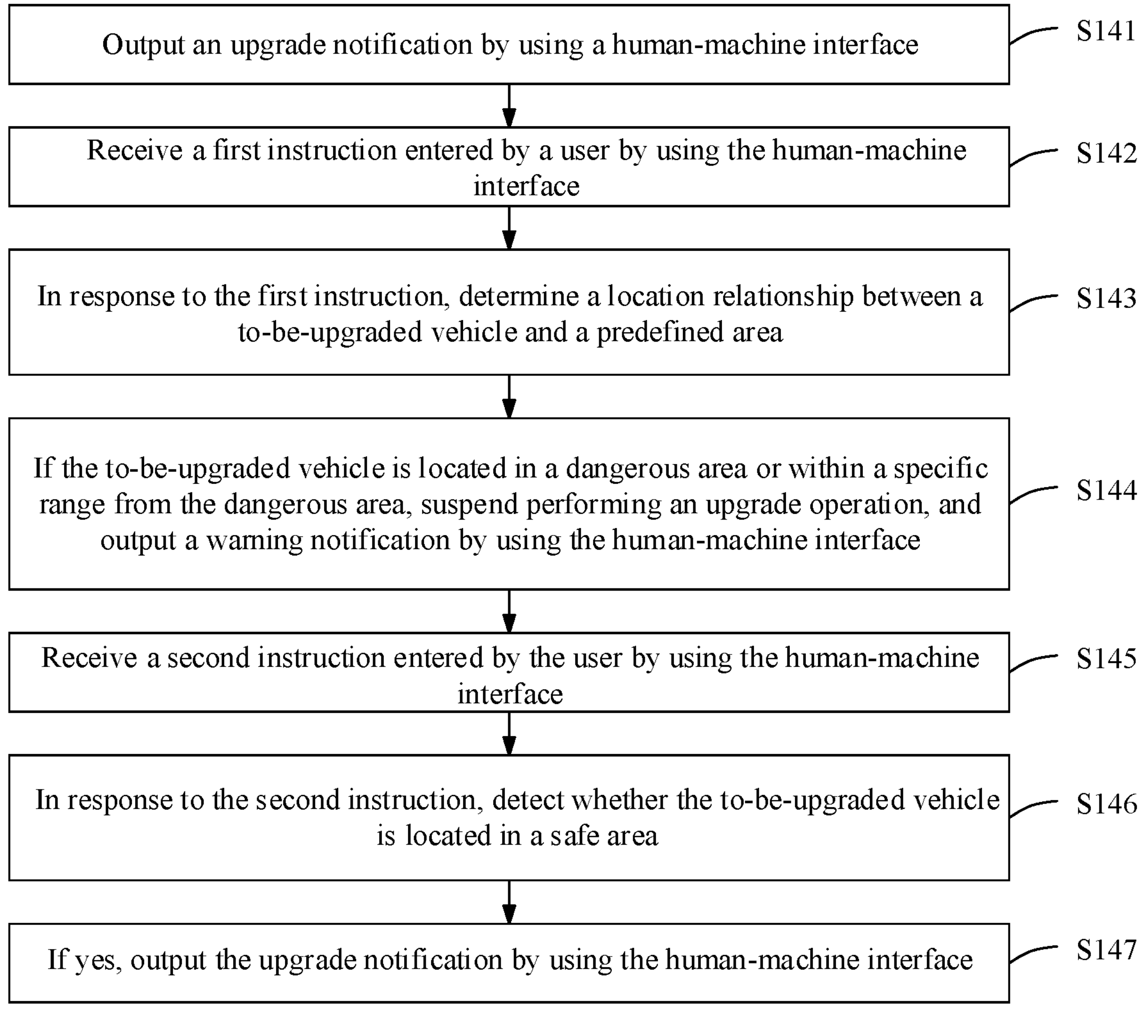
FIG. 14 is a schematic flowchart of another over-the-air upgrade method according to an embodiment of this application.

FIG. 14 is a schematic flowchart of another over-the-air upgrade method according to an embodiment of this application. The over-the-air upgrade method may be performed by the foregoing vehicle-mounted terminal device. The method includes the following steps.

Step S141: Output an upgrade notification by using a human-machine interface.

In this embodiment of this application, the upgrade notification is output by using the human-machine interface, to notify a user that there is a new upgrade package currently.

Step S142: Receive a first instruction entered by the user by using the human-machine interface.

Step S143: In response to the first instruction, determine a location relationship between a to-be-upgraded vehicle and a predefined area.

In this embodiment of this application, the relationship between the to-be-upgraded vehicle and the predefined area includes but is not limited to that an area attribute of a location of the to-be-upgraded vehicle is a safe area, an area attribute of a location of the to-be-upgraded vehicle is a dangerous area, or the like.

When the area attribute of the location of the to-be-upgraded vehicle is the safe area, an upgrade operation is performed. Further, in a process in which the upgrade operation is performed, location information of the to-be-upgraded vehicle may be obtained in real time, to determine the location relationship between the to-be-upgraded vehicle and the predefined area.

Step S144: If the to-be-upgraded vehicle is located in the dangerous area or within a specific range from the dangerous area, suspend performing the upgrade operation, and output a warning notification by using the human-machine interface.

Step S145: Receive a second instruction entered by the user by using the human-machine interface.

Step S146: In response to the second instruction, detect whether the to-be-upgraded vehicle is located in the safe area.

Step S147: If yes, output the upgrade notification by using the human-machine interface.

In this embodiment of this application, after the to-be-upgraded vehicle moves from the dangerous area to the safe area, the upgrade notification is output by using the human-machine interface, to notify the user that the upgrade operation may continue to be performed currently.

Figure 15:
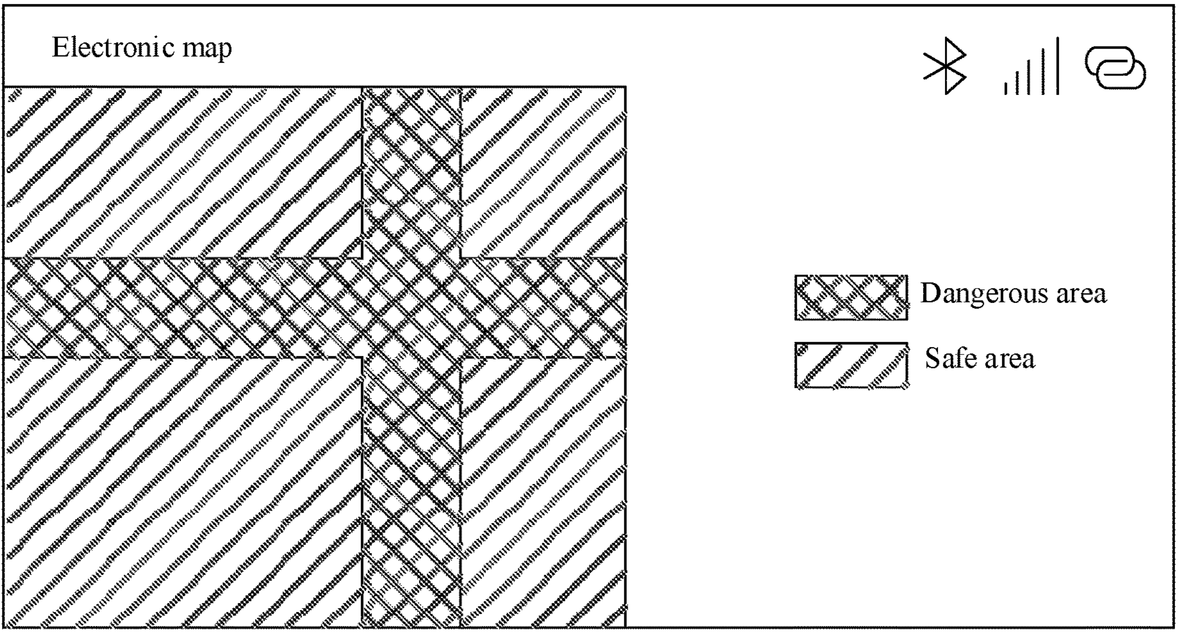
FIG. 15 is a schematic diagram of a human-machine interface according to an embodiment of this application.

In this embodiment of this application, the human-machine interface may further present an electronic map. With reference to FIG. 15, the electronic map presented on the human-machine interface includes one or more of the safe area and the dangerous area, the safe area is displayed on the electronic map in a first display manner, and the dangerous area is displayed on the electronic map in a second display manner different from the first display manner. The display manner may be using a color, an area filling pattern, an identifier, or the like. For example, the first display manner is using a green color, that is, the safe area is displayed in green, and the second display manner is using a red color, that is, the dangerous area is displayed in red. Further, a third area may be displayed in a third display manner different from the first display manner and different from the second display manner. This is not specifically limited in this application. Different areas are displayed on the electronic map, so that the user can move to a corresponding location for upgrading based on a requirement of the user.

The following describes the over-the-air upgrade method in embodiments of this application from the perspective of interaction between an upgrade server and a vehicle-mounted terminal device.

Figure 16:
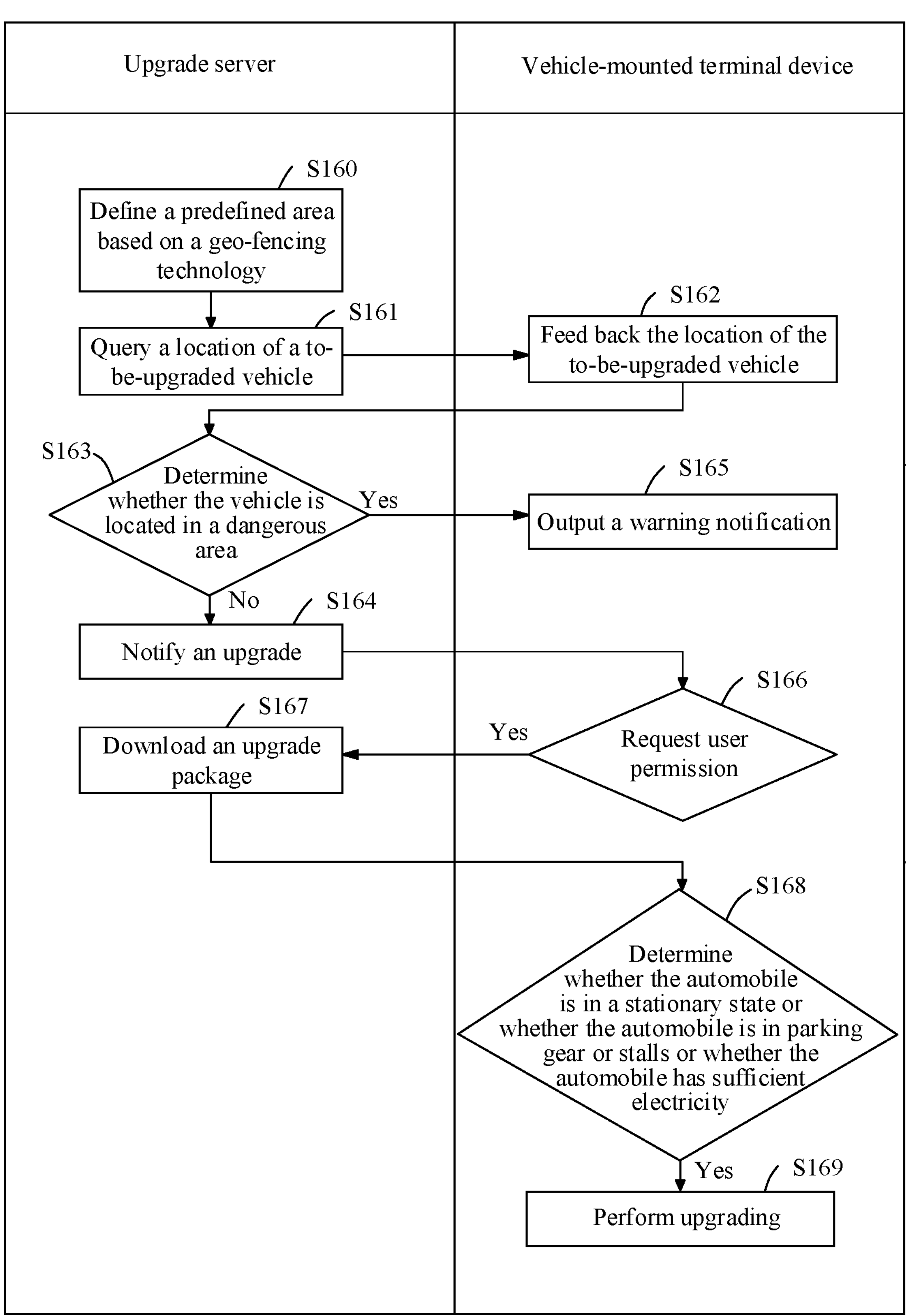
FIG. 16 is a schematic flowchart of interaction between an upgrade server and a vehicle-mounted terminal device according to an embodiment of this application.

Refer to FIG. 16. An upgrade server and a vehicle-mounted terminal device interact with each other, and the upgrade server performs an over-the-air upgrade method in an embodiment of this application.

Step S160: Define a predefined area based on a geo-fencing technology.

In this embodiment of this application, the upgrade server may create a geo-fence on an electronic map by using the geo-fencing technology, obtain a virtual geographic boundary through enclosure by using a virtual fence, and define area attributes of all enclosed virtual geographic boundaries, that is, define a safe area and/or a dangerous area on the electronic map.

Step S161: Query a location of a to-be-upgraded vehicle.

When there is an upgrade task for a vehicle, the vehicle is a to-be-upgraded vehicle, and a location of the to-be-upgraded vehicle is queried from the to-be-upgraded vehicle.

Step S162: Feed back the location of the to-be-upgraded vehicle.

When the to-be-upgraded vehicle receives information that is used to query the location of the to-be-upgraded vehicle and that is sent by the upgrade server, the to-be-upgraded vehicle feeds back the location of the to-be-upgraded vehicle to the upgrade server.

Step S163: Determine whether the vehicle is located in the dangerous area.

Based on location information fed back by the to-be-upgraded vehicle, the upgrade server determines whether the to-be-upgraded vehicle is located in the dangerous area, for example, determines whether the to-be-upgraded vehicle is located within a boundary of the dangerous area or within a specific range from the boundary of the dangerous area, or determines whether the to-be-upgraded vehicle enters a virtual geographic boundary corresponding to the dangerous area.

Step S164: If no, notify an upgrade.

If the to-be-upgraded vehicle is not located in the dangerous area, an upgrade message is pushed to the to-be-upgraded vehicle, to notify the upgrade.

Step S165: If yes, output a warning notification.

If the to-be-upgraded vehicle is located in the dangerous area, no upgrade notification is provided, or the warning notification is output to notify a user that the vehicle is currently located in the dangerous area and is currently not suitable for upgrading.

Step S166: Request user permission.

When the to-be-upgraded vehicle is notified of the upgrade, the to-be-upgraded vehicle receives the notification, and requests upgrade permission from the user by using a human-machine interface.

Step S167: Download an upgrade package.

When the user permits the upgrade, the to-be-upgraded vehicle downloads the upgrade package from the upgrade server.

Step S168: Determine whether the automobile is in a stationary state or whether the automobile is in parking gear or stalls or whether the automobile has sufficient electricity.

After receiving the upgrade package, the to-be-upgraded vehicle may further determine a status of the vehicle, and determine, based on the status of the vehicle, whether to perform an upgrade operation. Before upgrading, the automobile checks whether the vehicle is in the stationary state or in parking gear. If no, upgrading is not allowed to be performed. In this way, even if an abnormality occurs or some functions are temporarily unavailable during upgrading of the automobile, the automobile is not out of control in a motion process. For example, whether the automobile has sufficient electricity is checked before upgrading. If electricity is insufficient, upgrading is not allowed to be performed. This avoids the following case: An upgrade process of the automobile is interrupted due to a shortage of electricity, in which case a software exception may be caused as only a part of software of the automobile is upgraded, and the automobile has an uncertain out-of-control risk when the automobile is driven again.

Step S169: If yes, perform upgrading.

If a safe execution condition of the vehicle is met, upgrading is performed.

Figure 17:
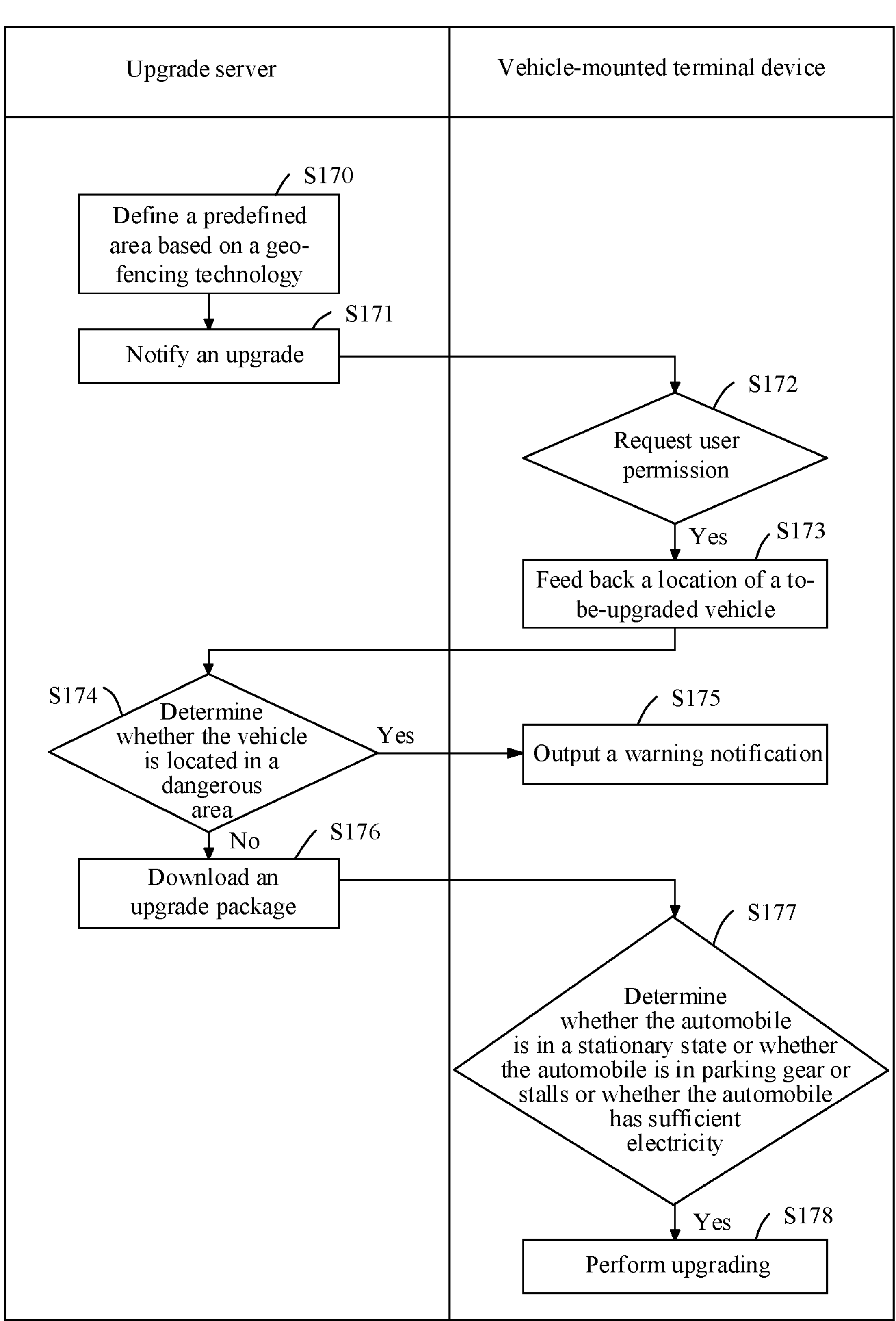
FIG. 17 is a schematic flowchart of interaction between an upgrade server and a vehicle-mounted terminal device according to an embodiment of this application.

Refer to FIG. 17. An upgrade server and a vehicle-mounted terminal device interact with each other, and the upgrade server performs an over-the-air upgrade method in an embodiment of this application.

Step S170: Define a predefined area based on a geo-fencing technology.

Step S171: Notify an upgrade.

Step S172: Request user permission.

Step S173: Feed back a location of a to-be-upgraded vehicle.

Step S174: Determine whether the vehicle is located in a dangerous area.

Step S175: If yes, output a warning notification.

Step S176: If no, download an upgrade package.

Step S177: Determine whether the automobile is in a stationary state or whether the automobile is in parking gear or stalls or whether the automobile has sufficient electricity.

Step S178: If yes, perform upgrading.

In this embodiment of this application, a difference between FIG. 16 and FIG. 17 lies in that a step of determining whether the vehicle is located in the dangerous area is performed after user permission and before upgrade package downloading. A location relationship between the to-be-upgraded vehicle and the predefined area merely needs to be determined before the vehicle-mounted terminal device performs upgrading. For example, the location relationship may be alternatively determined after upgrade package downloading and before upgrade execution.

Figure 18:
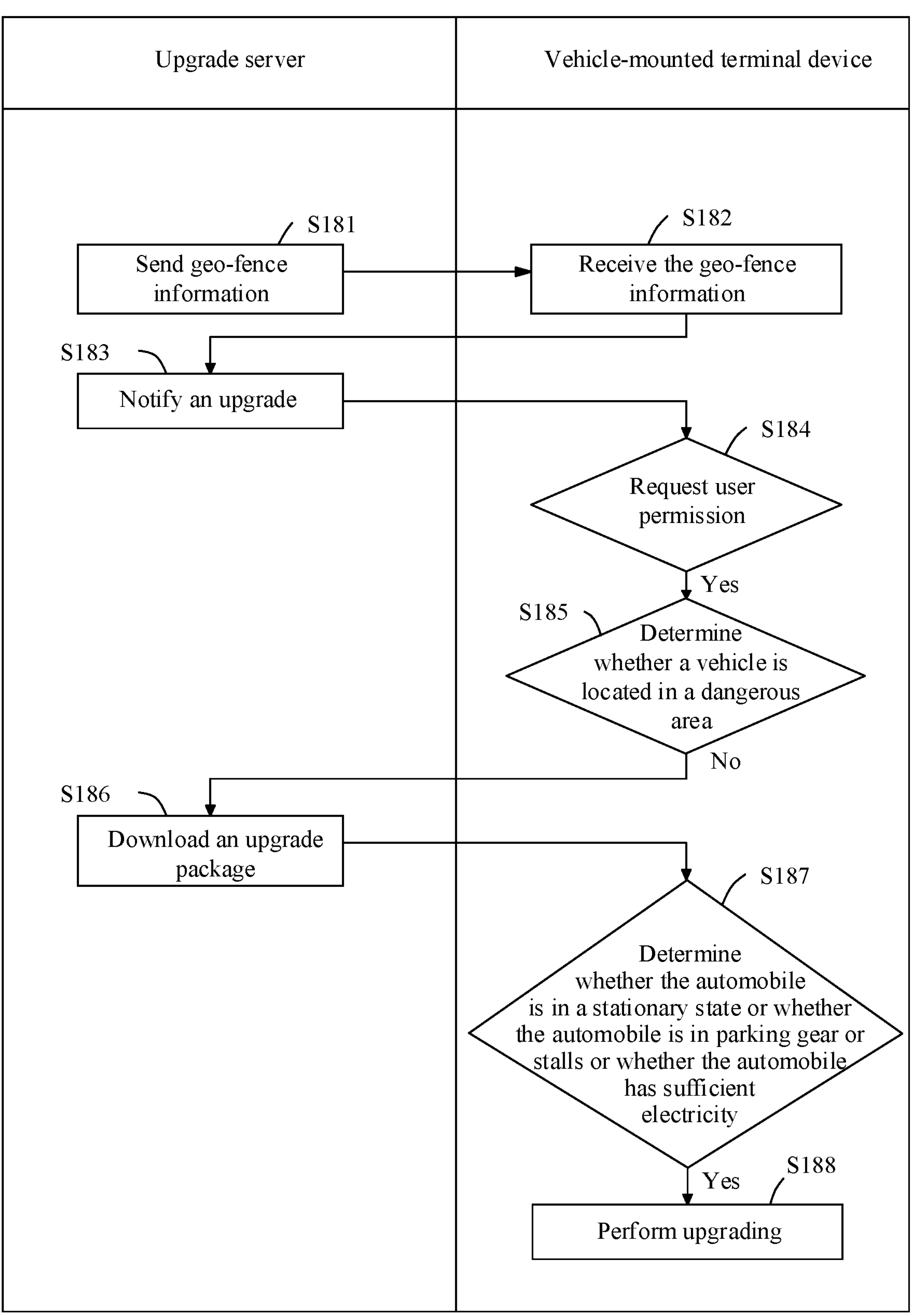
FIG. 18 is a schematic flowchart of interaction between an upgrade server and a vehicle-mounted terminal device according to an embodiment of this application.

Refer to FIG. 18. An upgrade server and a vehicle-mounted terminal device interact with each other, and the vehicle-mounted terminal device performs an over-the-air upgrade method in an embodiment of this application.

Step S181: Send geo-fence information.

The upgrade server defines each dangerous area and/or safe area on an electronic map by using a geo-fencing technology, and then sends geo-fence information of the dangerous area or the safe area to the vehicle-mounted terminal device.

Step S182: Receive the geo-fence information.

The vehicle-mounted terminal device receives and stores the geo-fence information.

Step S183: Notify an upgrade.

When there is an upgrade task, the upgrade server sends an upgrade notification to the vehicle-mounted terminal.

Step S184: Request user permission.

After the upgrade notification is received, permission is requested from a user by using a human-machine interface.

Step S185: Determine whether a vehicle is located in a dangerous area.

If the user permission is obtained, the vehicle-mounted terminal device determines, based on location information of the to-be-upgraded vehicle, whether the to-be-upgraded vehicle is located or to be located in the dangerous area.

Step S186: If no, download an upgrade package.

If the to-be-upgraded vehicle is located in the dangerous area or within a specific range from the dangerous area, an upgrade operation is not performed. If no, an upgrade operation is performed, and the upgrade package is downloaded from the upgrade server.

Step S187: Determine whether the automobile is in a stationary state or whether the automobile is in parking gear or stalls or whether the automobile has sufficient electricity.

Step S188: If yes, perform upgrading.

In this embodiment of this application, a difference between FIG. 18 and FIG. 17 lies in that a step of determining whether the vehicle is located in the OTA dangerous area is performed by the vehicle-mounted terminal device, and the upgrade server does not need to obtain the location information of the to-be-upgraded vehicle. This helps protect user privacy.

The descriptions of the procedures corresponding to the accompanying drawings have respective focuses. For a part that is not described in detail in a procedure, refer to related descriptions of another procedure.

All or some of the foregoing embodiments may be implemented by using software, hardware, firmware, or any combination thereof. When software is used for implementation, all or some of the embodiments may be implemented in a form of a computer program product. A computer program product for implementing model training includes one or more computer instructions for model training. When these computer program instructions are loaded and executed on a computer, all or some of the procedures or functions according to FIG. 4, FIG. 5, FIG. 6, FIG. 7, FIG. 9, FIG. 12, FIG. 13, FIG. 14, FIG. 16, FIG. 17, and FIG. 18 in embodiments of this application are generated.

The computer may be a general-purpose computer, a dedicated computer, a computer network, or another programmable apparatus. The computer instruction may be stored in a computer-readable storage medium, or may be transmitted from a computer-readable storage medium to another computer-readable storage medium. For example, the computer instruction may be transmitted from a website, a computer, a server, or a data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible to a computer, or may be a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state drive (solid state disk, SSD)), or the like.

A person of ordinary skill in the art may understand that all or some of the steps of the foregoing embodiments may be implemented by hardware, or may be implemented by a program instructing related hardware. The program may be stored in a computer-readable storage medium. The storage medium may be a read-only memory, a magnetic disk, an optical disc, or the like.

The foregoing embodiments provided in this application are not intended to limit this application. Any modification, equivalent replacement, or improvement made without departing from the spirit and principle of this application shall fall within the protection scope of this application.

What is claimed is:

1. An over-the-air upgrade method, wherein the method comprises:

obtaining location information of a vehicle; and providing an upgrade service based on a locational relationship between the vehicle and a predefined area, wherein the predefined area comprises one or more of a first area or a second area, the first area indicates an area in which upgrading is not allowed, and the second area indicates an area in which upgrading is allowed, wherein the first area is determined based on at least one of the following attributes of a location a lane area, a congested area, or a slow-moving area, wherein providing the upgrade service further comprises:

in response to a first instruction entered by a user, providing the upgrade service for the vehicle when the vehicle is located in the second area, wherein the first instruction instructs to provide the upgrade service;

outputting a warning notification to the vehicle when it is detected that the vehicle enters the first area or a specific range from the first area, wherein the warning notification indicates that the vehicle is unsuitable for upgrading; and in response to a second instruction entered by the user, delaying providing the upgrade service for the vehicle, until the vehicle is located in the second area, wherein the second instruction instructs to delay providing the upgrade service.

2. The method according to claim 1, wherein the providing an upgrade service based on a locational relationship between the vehicle and a predefined area comprises:

determining an area attribute of a location of the vehicle based on the location of the vehicle, wherein the area attribute comprises the first area or the second area.

3. The method according to claim 1, wherein a boundary of one or more of the first area or the second area is adjustable.

4. The method according to claim 3, wherein the boundary of the one or more of the first area or the second area is adjusted based on real-time information received in real time, wherein the real-time information comprises one or more of information that affects a definition of the boundary of the first area or information that affects a definition of the boundary of the second area, and the real-time information further comprises one or more of the following pieces of information: a risk of an upgrade task, current road condition information, or positioning precision of the vehicle.

5. The method according to claim 1, wherein the upgrade service comprises one or more of the following services:

pushing an upgrade message to the vehicle, sending an upgrade package download address to the vehicle, or sending an upgrade package to the vehicle.

6. An over-the-air upgrade method, wherein the method comprises:

obtaining location information of a vehicle; and performing an upgrade operation based on a location relationship between the vehicle and a predefined area, wherein the predefined area comprises one or more of a first area or a second area, the first area indicates an area in which upgrading is not allowed, and the second area indicates an area in which upgrading is allowed, wherein the first area is determined based on at least one of the following attributes of a location a lane area, a congested area, or a slow-moving area, wherein perform the upgrade operation comprises:

in response to a first instruction entered by a user, output a warning notification when the vehicle is located in the first area or within a specific range from the first area, wherein the first instruction instructs to perform the upgrade operation, and the warning notification indicates that the vehicle is unsuitable for upgrading; and in response to a second instruction entered by the user, delay performing the upgrade operation, until the vehicle is located in the second area, wherein the second instruction instructs to delay performing the upgrade operation.

7. The method according to claim 6, wherein the method further comprises:

displaying the second area on an electronic map in a first display manner; and displaying the first area on the electronic map in a second display manner different from the first display manner.

8. The method according to claim 6, wherein the performing an upgrade operation based on a location relationship between the vehicle and a predefined area further comprises:

in response to determining that the vehicle is located in the first area or within a specific range from the first area, delaying performing the upgrade operation, until the vehicle is located in the second area.

9. The method according to claim 6, wherein the method further comprises:

in response to a first instruction entered by a user, performing the upgrade operation when the vehicle is located in the second area, wherein the first instruction instructs to perform the upgrade operation;

outputting a warning notification in response to determining that the vehicle enters the first area or a specific range from the first area, wherein the warning notification indicates that the vehicle is unsuitable for upgrading; and in response to a second instruction entered by the user, delaying performing the upgrade operation, until the vehicle is located in the second area, wherein the second instruction instructs to delay performing the upgrade operation.

10. An over-the-air upgrade apparatus, comprising:

at least one processor; and one or more memories coupled to the at least one processor and storing programming instructions for execution by the at least one processor to cause the apparatus to:

obtain location information of a vehicle; and provide an upgrade service based on a locational relationship between the vehicle and a predefined area, wherein the predefined area comprises one or more of a first area or a second area, the first area indicates an area in which upgrading is not allowed, and the second area indicates an area in which upgrading is allowed, wherein the first area is determined based on at least one of the following attributes of a location a lane area, a congested area, or a slow-moving area, wherein provide the upgrade service further comprises:

in response to a first instruction entered by a user, providing the upgrade service for the vehicle when the vehicle is located in the second area, wherein the first instruction instructs to provide the upgrade service;

outputting a warning notification to the vehicle when it is detected that the vehicle enters the first area or a specific range from the first area, wherein the warning notification indicates that the vehicle is unsuitable for upgrading; and in response to a second instruction entered by the user, delaying providing the upgrade service for the vehicle, until the vehicle is located in the second area, wherein the second instruction instructs to delay providing the upgrade service.

11. The apparatus according to claim 10, wherein the programming instructions are for execution by the at least one processor to cause the apparatus to:

determine an area attribute of a location of the vehicle based on the location of the vehicle, wherein the area attribute comprises the first area or the second area.

12. The apparatus according to claim 10, wherein a boundary of one or more of the first area or the second area is adjustable.

13. The apparatus according to claim 12, wherein the boundary of the one or more of the first area or the second area is adjusted based on real-time information received in real time, wherein the real-time information comprises one or more of information that affects a definition of the boundary of the first area or information that affects a definition of the boundary of the second area, and the real-time information further comprises one or more of the following pieces of information: a risk of an upgrade task, current road condition information, or positioning precision of the vehicle.

14. The apparatus according to claim 10, wherein the upgrade service comprises one or more of the following services:

pushing an upgrade message to the vehicle, sending an upgrade package download address to the vehicle, or sending an upgrade package to the vehicle.

15. An over-the-air upgrade apparatus, comprising:

at least one processor; and one or more memories coupled to the at least one processor and storing programming instructions for execution by the at least one processor to cause the apparatus to:

obtain location information of a vehicle; and perform an upgrade operation based on a location relationship between the vehicle and a predefined area, wherein the predefined area comprises one or more of a first area and a second area, the first area indicates an area in which upgrading is not allowed, and the second area indicates an area in which upgrading is allowed, wherein the first area is determined based on at least one of the following attributes of a location a lane area, a congested area, or a slow-moving area, wherein perform the upgrade operation comprises:

in response to a first instruction entered by a user, output a warning notification when the vehicle is located in the first area or within a specific range from the first area, wherein the first instruction instructs to perform the upgrade operation, and the warning notification indicates that the vehicle is unsuitable for upgrading; and in response to a second instruction entered by the user, delay performing the upgrade operation, until the vehicle is located in the second area, wherein the second instruction instructs to delay performing the upgrade operation.

16. The apparatus according to claim 15, wherein the programming instructions are for execution by the at least one processor to cause the apparatus to:

display the second area on an electronic map in a first display manner; and display the first area on the electronic map in a second display manner different from the first display manner.

17. The apparatus according to claim 15, wherein the programming instructions are for execution by the at least one processor to cause the apparatus to:

in response to determining that the vehicle is located in the first area or within a specific range from the first area, delay performing the upgrade operation, until the vehicle is located in the second area.

18. The apparatus according to claim 15, wherein the programming instructions, when executed by the at least one processor, cause the apparatus to:

in response to a first instruction entered by a user, perform the upgrade operation when the vehicle is located in the second area, wherein the first instruction instructs to perform the upgrade operation;

output a warning notification in response to determining that the vehicle enters the first area or a specific range from the first area, wherein the warning notification indicates that the vehicle is unsuitable for upgrading; and in response to a second instruction entered by the user, delay performing the upgrade operation, until the vehicle is located in the second area, wherein the second instruction instructs to delay performing the upgrade operation.

* * * * *